United States Patent

Ogusu et al.

[11] Patent Number: 5,875,168
[45] Date of Patent: Feb. 23, 1999

[54] PICKUP DEVICE FOR A DISK DRIVE DEVICE

[75] Inventors: Mikio Ogusu; Shinji Ohba; Hiroshi Sobukawa, all of Hamamatsu, Japan

[73] Assignee: Yamaha Corporation, Hamamatsu, Japan

[21] Appl. No.: 891,594

[22] Filed: Jul. 11, 1997

[30] Foreign Application Priority Data

Jul. 26, 1996 [JP] Japan .................................. 8-198158

[51] Int. Cl.$^6$ .................................................. G11B 17/00
[52] U.S. Cl. .......................................... 369/247; 369/244
[58] Field of Search .................................. 369/244, 249, 369/215, 247

[56] References Cited

U.S. PATENT DOCUMENTS

| 4,653,856 | 3/1987 | Kamiko | 350/255 |
| 5,124,973 | 6/1992 | Igata | 369/244 |

FOREIGN PATENT DOCUMENTS 0290979  5/1988  European Pat. Off. .

*Primary Examiner*—Allen T. Cao
*Attorney, Agent, or Firm*—Loeb & Loeb LLP

[57] ABSTRACT

A first adjusting base made of a leaf spring material is supported on a holder in such a manner that the first adjusting base crosses the moving direction of the holder and is slightly pivotable about a first pivot axis which is parallel to a disk surface. A second adjusting base made of a leaf spring material is supported on the first adjusting base in such a manner that the second adjusting base crosses the first pivot axis and is slightly pivotable about a second pivot axis. The first and second adjusting bases are biased in a slightly pivoting direction by their own elasticity and, by turning screws which restrict the biasing, the first and second bases are pivoted to adjust the direction of an optical axis of a pickup head. Shaking of the pickup head is prevented and shock to the pickup head is absorbed by elasticity of the first and second adjusting bases whereby the device can be made compact and light.

3 Claims, 20 Drawing Sheets

FIG. 2A
FIG. 2B
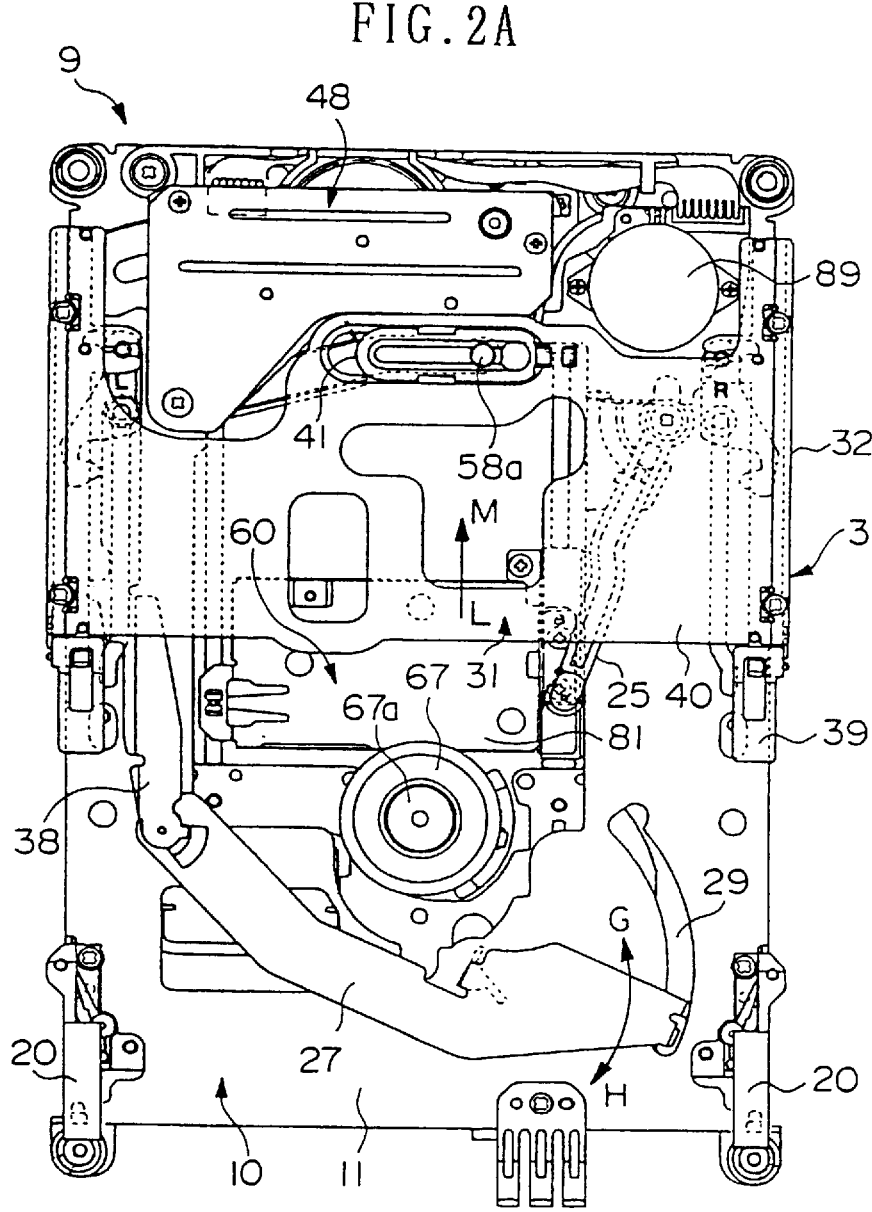
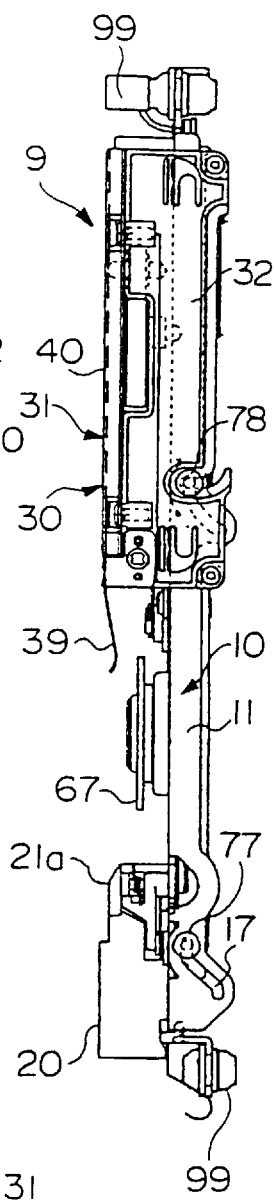
FIG. 2C

PICKUP DEVICE FOR A DISK DRIVE DEVICE

BACKGROUND OF THE INVENTION

This invention relates to a pickup device for a disk drive device for reproducing a disk on which signals are optically or magnetically recorded or writing signals on a disk and, more particularly, to a technique capable of adjusting an optical axis of a pickup device reading or writing signals on a disk and also capable of improving shock resistance of the pickup device.

In the disk drive device, a pickup device including a pickup head is disposed opposite to a disk surface (i.e., a surface on which signals are recorded) and is supported slidably in the radial direction of the disk. The pickup head reads and writes signals on the disk surface while the pickup device slides in the radial direction of the disk. For ensuring accurate reading and writing of signals on the disk surface, the optical axis of the pickup head must constantly cross the disk surface. An adjusting device for this purpose is disclosed, for example, in Japanese Utility Model Publication No. Hei-5-4095. In this adjusting device, a pickup head is mounted on two adjusting bases which are slightly pivotable about two pivot axes in the radial direction of the disk and a direction crossing the radial direction. By turning screws mounted on pivoting end portions of the respective adjusting bases, these adjusting bases are slightly pivoted and the optical axis of the pickup is thereby adjusted. A coil spring biasing the respective adjusting bases in one pivoting direction is provided between the respective adjusting bases and the screws and shaking of the pickup head is prevented and shock to the pickup head is absorbed by the coil spring.

In the prior art adjusting device, however, the provision of the shake preventing and shock absorbing coil spring makes the device large (particularly in the thickness) and heavy with the result that the moving speed and response characteristic of the pickup device are reduced and the manufacturing cost increases due to increase in the number of component parts.

It is, therefore, an object of the invention to provide a pickup device for a disk drive device which is made compact and light and thereby the moving speed and response characteristic are improved and the manufacturing cost is reduced.

SUMMARY OF THE INVENTION

For achieving the above described object of the invention, there is provided a pickup device for a disk drive device comprising a head base supported on a guide member slidably in the radial direction of a disk and a pickup head mounted on the head base and reading signals recorded on the disk or writing signals on the disk by the pickup head by moving the head base in the radial direction of the disk wherein said head base comprises a holder supported on said guide member slidably in the radial direction of the disk, a first adjusting base made of a leaf spring material in the form of a plate and supported on said holder in such a manner that the first adjusting base crosses the moving direction of the holder in a state in which the first adjusting base opposes the disk substantially in parallel to a surface of the disk and is pivotable slightly about a first pivot axis which is parallel to the disk surface, and being biased in a predetermined slightly pivoting direction by elasticity of the first adjusting base itself, a first adjusting member for adjusting and determining a slightly pivoted position of the first adjusting base, a second adjusting base formed of a leaf spring material in the form of a plate and supported on the side of the disk on said first adjusting member in such a manner that the second adjusting base crosses the first pivot axis in a state in which the second adjusting base opposes the disk substantially in parallel to the surface of the disk and is pivotable slightly about a second pivot axis which is parallel to the disk surface, and being biased in a predetermined slightly pivoting direction by elasticity of itself, and a second adjusting member for adjusting and determining a slightly pivoted position of the second adjusting base, said pickup head being mounted on said second adjusting base.

According to the invention, by slightly pivoting the first adjusting base about the first pivot axis by the first adjusting member, the optical axis of the pickup head is inclined in the radial direction of the disk and thereby is adjusted in this direction. The first adjusting base is biased in the predetermined slightly pivoting direction by its own elasticity and this biasing state is supported by the first adjusting member. Accordingly, occurrence of shaking is prevented and shock is absorbed in the first adjusting base.

By slightly pivoting the second adjusting base about the second pivoting axis by the second adjusting member, the optical axis of the pickup head is inclined in the circumferential direction of the disk and is adjusted in this direction. The second adjusting base is biased in the predetermined slight pivoting direction by its own elasticity and this biasing state is supported by the second adjusting member. Accordingly, occurrence of shaking is prevented and shock is absorbed in the second adjusting base.

Since the first and second adjusting bases are made of a leaf spring material and occurrence of shaking is prevented and shock is absorbed by the elasticity of the first and second adjusting bases themselves, other elastic members such as coil springs are unnecessary whereby the pickup device can be made compact and light in weight with the result that the moving speed and response characteristic of the pickup device are improved and the manufacturing cost is reduced.

In one aspect of the invention, the first adjusting base is supported on the holder slightly pivotably along a plane which is substantially parallel to the surface of the disk and is biased in a predetermined slightly pivoting direction by elasticity of the first adjusting base itself.

According to this aspect of the invention, shock to the pickup head in a direction parallel to the disk surface is mitigated by slightly pivoting the first adjusting base in this direction and shock resistance is thereby improved.

In another aspect of the invention, the second adjusting base comprises a support piece which is adapted to be elastically deformed by elasticity of the second adjusting base itself and said pickup head is mounted on the support piece.

According to this aspect of the invention, strain produced in the pickup head in mounting the pickup head to he second adjusting base is released by the elastic deformation of the support piece, so that stress is not accumulated in the pickup and the efficiency of the pickup head is maintained over a long period of time.

A preferred embodiment of the invention will be described below with reference to the accompanying drawings.

BRIEF DESCRIPTION OF THE DRAWINGS

In the accompanying drawings,

FIG. 2A is a top plan view of a drive unit of the disk drive device;

FIG. 2B is a side elevation of the drive unit;

FIG. 2C is a front view of the drive unit;

DESCRIPTION OF PREFERRED EMBODIMENTS

Referring to the accompanying drawings, embodiments of the invention will now be described.

(1) Structure of an Embodiment

Figure 1A:
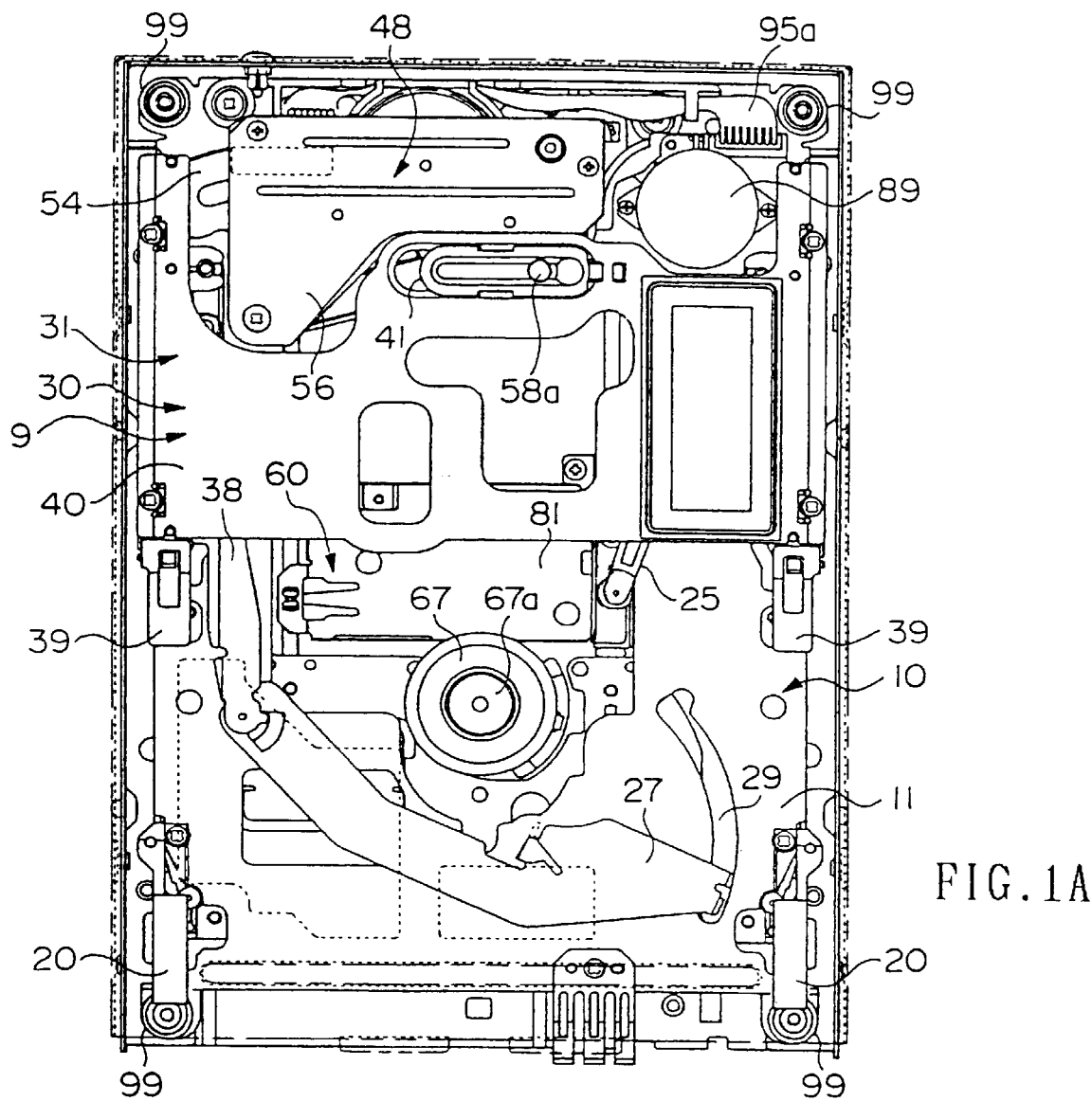
FIG. 1A is a top plan view showing an embodiment of a disk drive device made according to the invention.
Figure 1B:
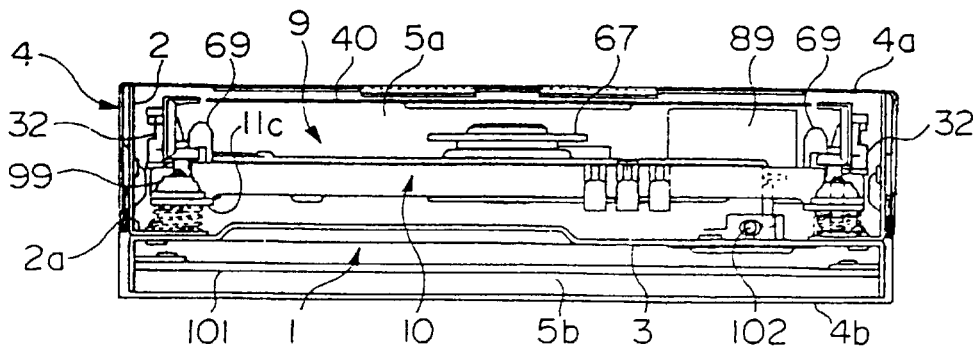
FIG. 1B is a front view of the embodiment.
Figure 13:
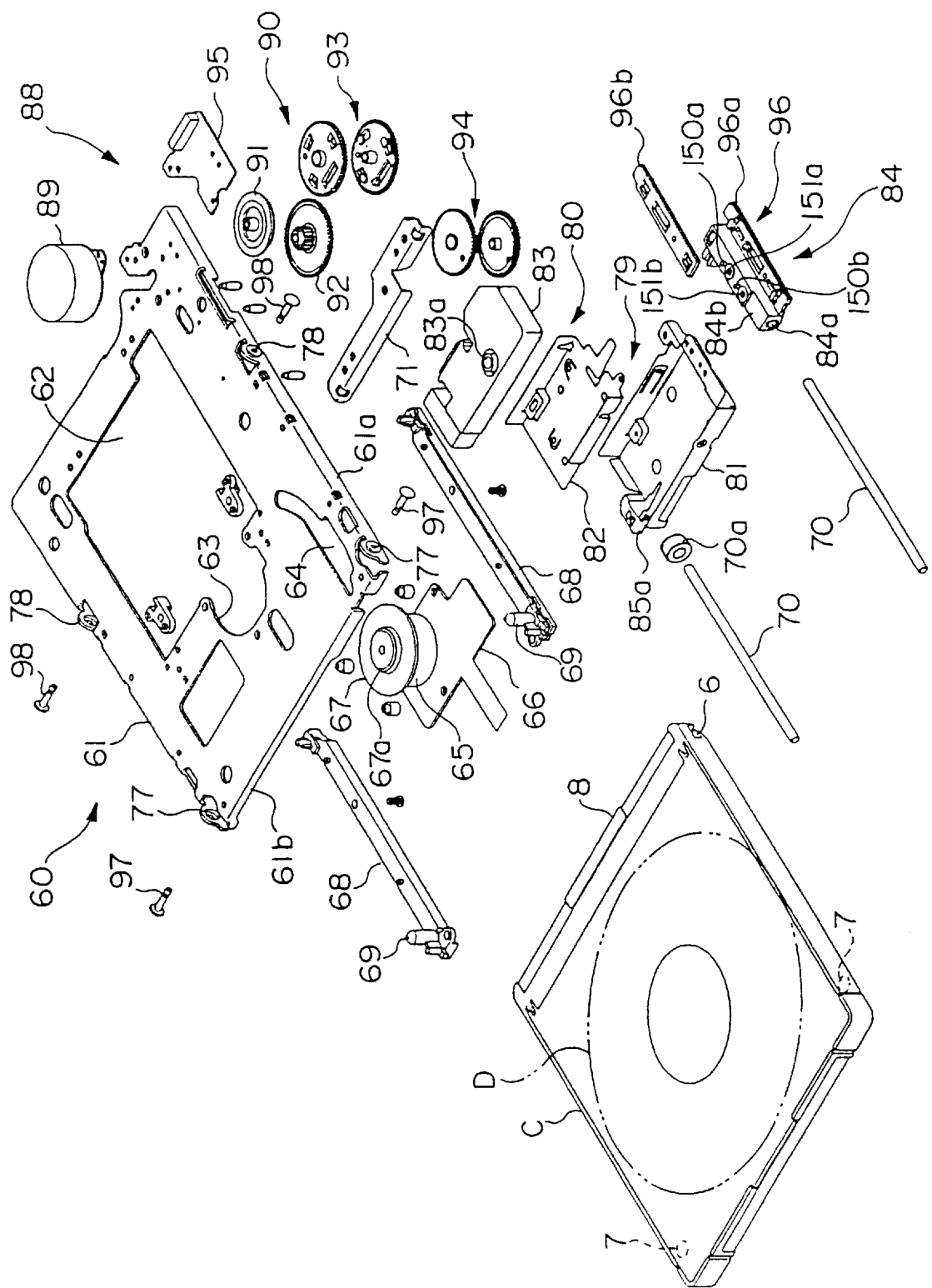
FIG. 13 is an exploded perspective view of the traverse unit.

FIGS. 1A and 1B show an embodiment of the disk drive device according to the invention. In this device, a disk D such as a magneto-optic disk received in a caddy C shown in FIG. 13 is loaded in the state in which it is housed in the caddy C. A signal recorded on the disk D is read or a signal is written on the disk D while the loaded disk D is rotated.

In FIGS. 1A and 1B, a frame unit 1 is constructed of a rectangular main frame 2 and a plate-like under frame 3 which is disposed below the main frame 2 and fixed to the lower surface of the main frame 2. An unillustrated front frame is fixed to the front surface (lower surface as viewed in FIG. 1A) of the main frame 2. A drive unit 9 shown in FIGS. 2 to 5 is provided on the under frame 3. The frame unit 1 and the drive unit 9 are covered with a top cover 4a which is fixed to the upper surface of the main frame 2, a bottom cover 4b which is fixed to the lower surface of the under frame 3 and an unillustrated front panel which is fixed to the front surface of the main frame 2. A casing 4 of the disk drive device is formed by the top cover 4a, bottom cover 4b and the front panel. The casing 4 is partitioned to a drive unit chamber 5a which is an upper chamber and a substrate chamber 5b which is a lower chamber by the under frame 3. The drive unit 9 is disposed in the drive unit chamber 5a and a main substrate 101 to be described later is disposed in the substrate chamber 5b.

The drive unit 9 is an assembly of a chassis unit 10, a loading unit 30 which is disposed on the chassis unit 10, and a traverse unit 60 which is disposed below the chassis unit 10. The caddy C is inserted in the direction of arrow A in FIGS. 4 and 5 and taken out in the direction of arrow B.

In the description made below, description concerning directions such as "front", "rear", "left" and "right" designates directions relative to the direction of insertion of the caddy C. That is to say, the caddy C is inserted from the front side to the rear side of the device. Further, as shown in FIG. 13, the caddy C in the inserted state is formed with hook holes 6 in the rear end portion of the two side surfaces and is formed with positioning holes 7 in the front end portion of the lower surface.

First, the chassis unit 10, the loading unit 30 and the traverse unit 60 will be described in this order.

A. Chassis Unit

Figure 6:
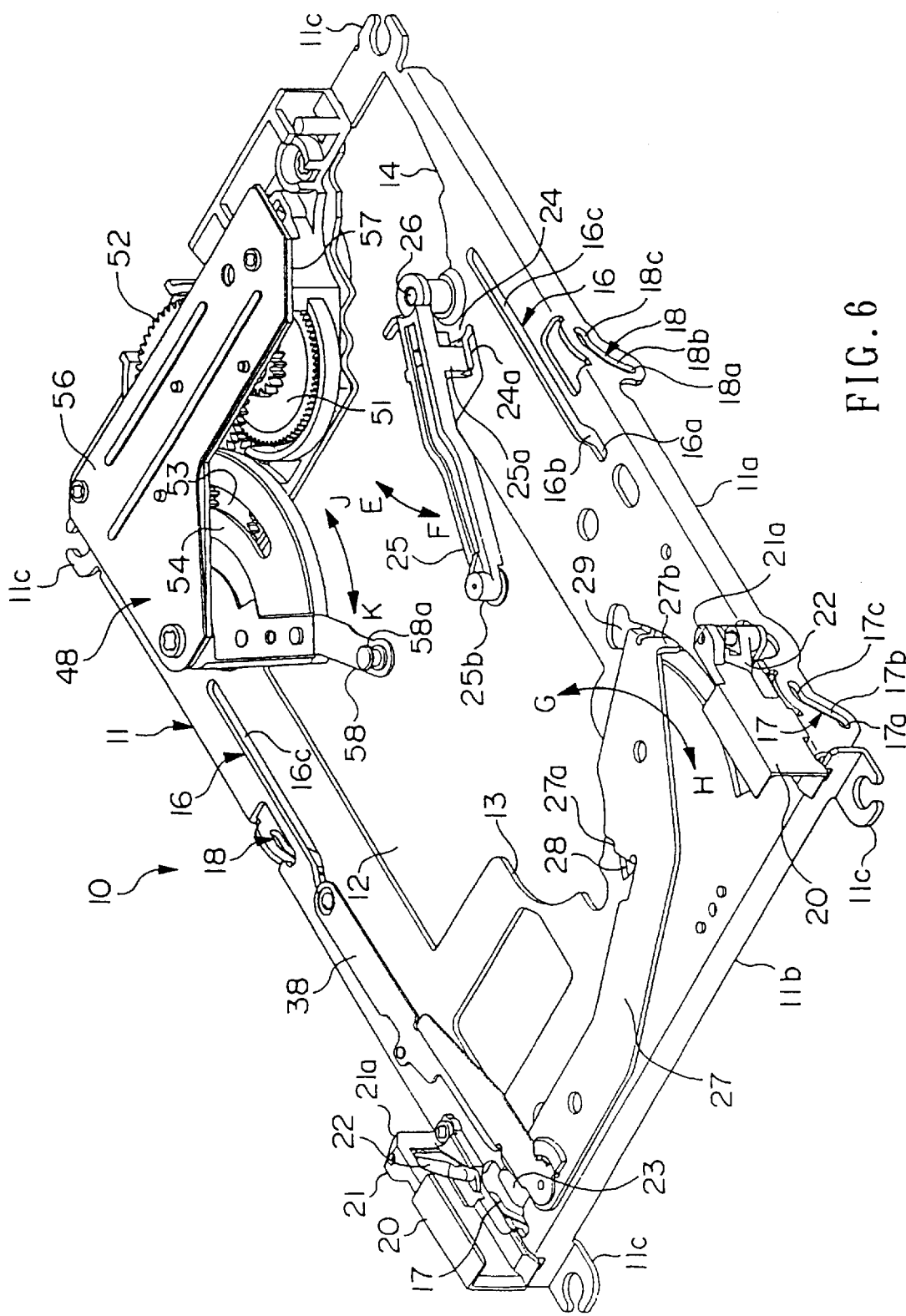
FIG. 6 is a perspective view showing a chassis unit.
Figure 7:
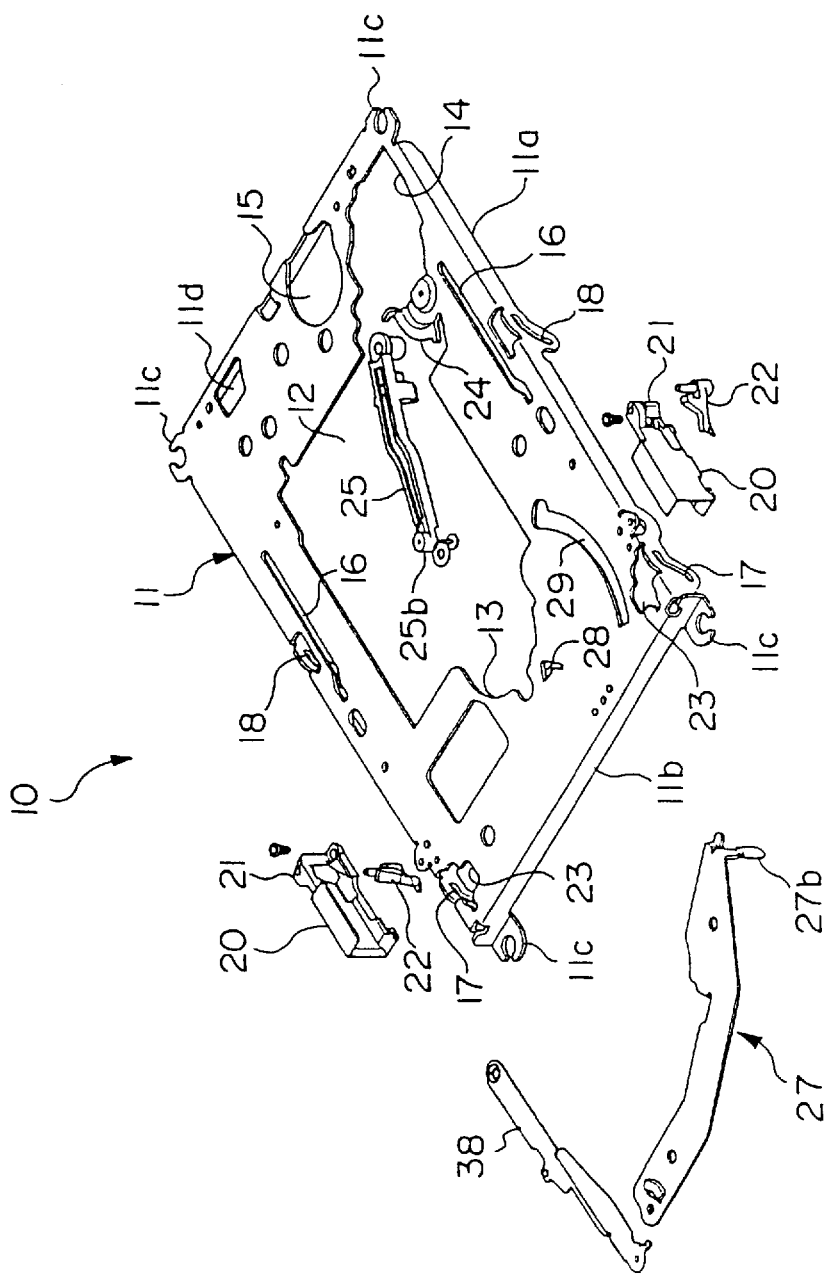
FIG. 7 is an exploded perspective view of the chassis unit.

As shown in FIGS. 6 and 7, the chassis unit 10 includes, as its main element, a main chassis 11 made of a thin rectangular metal plate. Long edge portions and short edge portions of the main chassis 11 are bent downwardly at a right angle to form bent portions 11a and 11b. A substantially rectangular central opening 12 is formed in the central portion of the main chassis 11. In the front central portion of the main chassis 11 is formed a semicircular front recessed portion 13 which is continuous to the central opening 12. In the rear central portion of the main chassis 11 is formed a rear recessed portion 14 which extends to the vicinity of the rear right corner of the main chassis 11 and is continuous to the central opening 12. On the left side of the rear recessed portion 14 is formed a loading motor mounting opening 15. On both sides of the central opening 12 are formed hook cam slits 16 extending in the forward and rearward direction of the main chassis 11 symmetrically with respect to a center line extending in the forward and rearward direction of the main chassis 11. These hook cam slits 16 are slits which guide guide pins 37c to be described later and each consist of a short eject section 16a, an oblique section 16b extending rearwardly and inwardly from the eject section 16a and a pull-in section 16c extending rearwardly from the oblique section 16b in parallel to the eject section 16a.

In front end portions and central portions of the left and right bent portions 11a are front cam slits 17 and rear cam slits 18 for guiding the traverse unit 60. The front cam slits 17 each consist of a stop hole section 17a formed in the front lower portion of the bent portion 11a and extending rearwardly, a lift up section 17b extending rearwardly from the stop hole section 17a and obliquely upwardly by a predetermined angle and a short horizontal section 17c extending rearwardly from the lift up section 17b. The rear cam slits 18 each consist of a stop hole section 18a formed in the front lower portion of the central bent portion 11a, a lift up section 18b extending rearwardly from the stop hole section 18a and obliquely upwardly by a predetermined angle and a short horizontal section 18c extending rearwardly from the lift up section 18b.

A section of the front cam slit 17 connecting the stop hole section 17a and the lift up section 17b and a section of the front cam slit 17 connecting the lift up section 17b and the horizontal section 17c are formed smoothly in the forward and rearward direction. The lift up section 18b of the rear cam slit 18b of the rear cam slit 18 rises from the stop hole section 18a with a larger inclination angle than the inclination angle of the lift up section 17b of the front cam slit 17, is slightly bent upwardly and continues to the horizontal section 18c with a curve which becomes more gradual toward the front end.

In both side portions of the front end portion of the main chassis 11 are provided a pair of fixed guides 20. These guides 20 are formed in the section of the letter C and fixed to the main chassis 11 in such a manner that their channel portions oppose each other. These fixed guides 20 each have a mounting piece 21 at the rear end thereof. A lever 22 for preventing an erroneous insertion of the caddy C is attached to the mounting piece 22. The rear upper surface of the mounting piece 21 is formed in an inclined surface 21a. A positioning pin insertion hole 23 is formed in the main chassis 11 in a portion inside of each fixed guide 20.

An arcuate base piece 24 is formed integrally with the main chassis 11 in a front right side of the rear recessed portion 14. To this base piece 24 is mounted an open lever 25 for opening a shutter 8 of the caddy C. This open lever 25 is pivotably supported on the base piece 24 through a pivot pin 26. As shown in FIG. 6, the open lever 25 is rotated along the surface of the main chassis 11 in the directions of arrows E and F. The open lever 25 is normally biased in the direction of arrow F by means of an unillustrated coil spring mounted in the base portion of the open lever 25 and is held at a standby position at which a projecting portion 25a formed in the lower portion of the open lever 25 abuts against a stopper 24a of the base piece 24. At the standby position, the forward end portion of the open lever 25 is directed forwardly and slightly inwardly and a pin 25b is provided in the forward end portion for engaging and opening the shutter 8 of the caddy C.

An eject lever 27 of a substantially crescent shape extending transversely of the main chassis 11 is provided on the main chassis 11 forwardly of the front recessed portion 13. A downwardly bent pivot piece 27a is formed slightly rightwardly of a central portion of the eject lever 27 and this pivot piece 27a is engaged in a small triangular pivot hole 28 formed in the main chassis 11. By this arrangement, the eject lever 27 is adapted to be rotated about the pivot pin 27a along the upper surface of the chassis 11 in the directions of arrows G and H. The eject lever 25 is downwardly bent at its right end portion to form an engaging pawl 27b. This engaging pawl 27b is engaged in an arcuate slit 29 formed in the main chassis 11 and extends downwardly. The rotation of the eject lever is permitted by the arcuate slit 29.

B. Loading Unit

Figure 8:
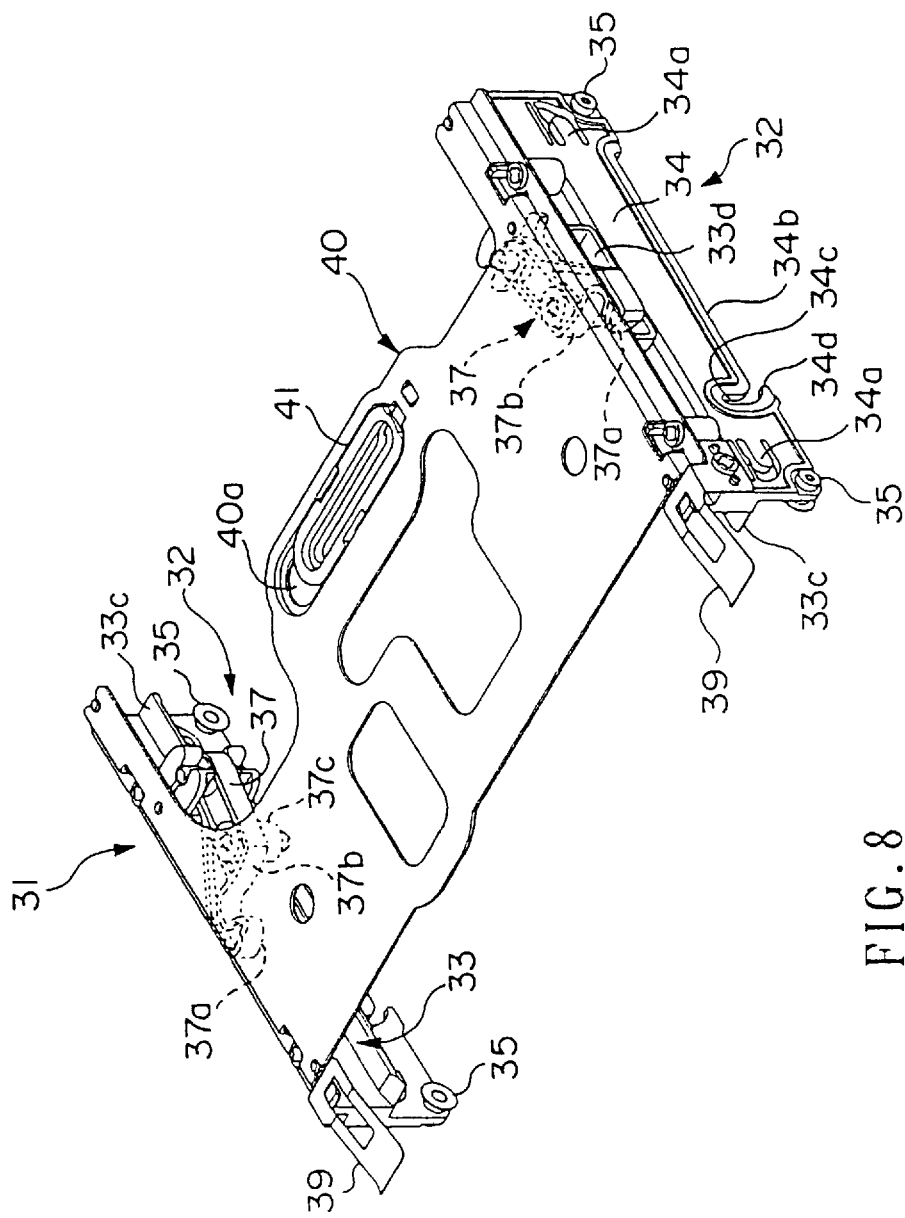
FIG. 8 is a perspective view showing a movable guide constituting a part of a loading unit.
Figure 9:
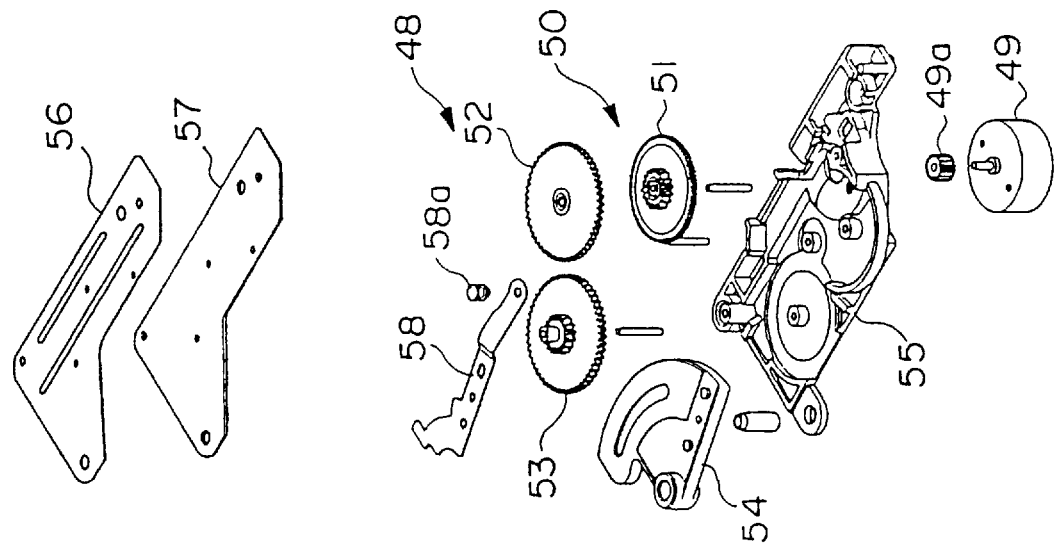
FIG. 9 is an exploded perspective view of the movable guide and a drive mechanism 48 constituting a part of the loading unit.
Figure 9:
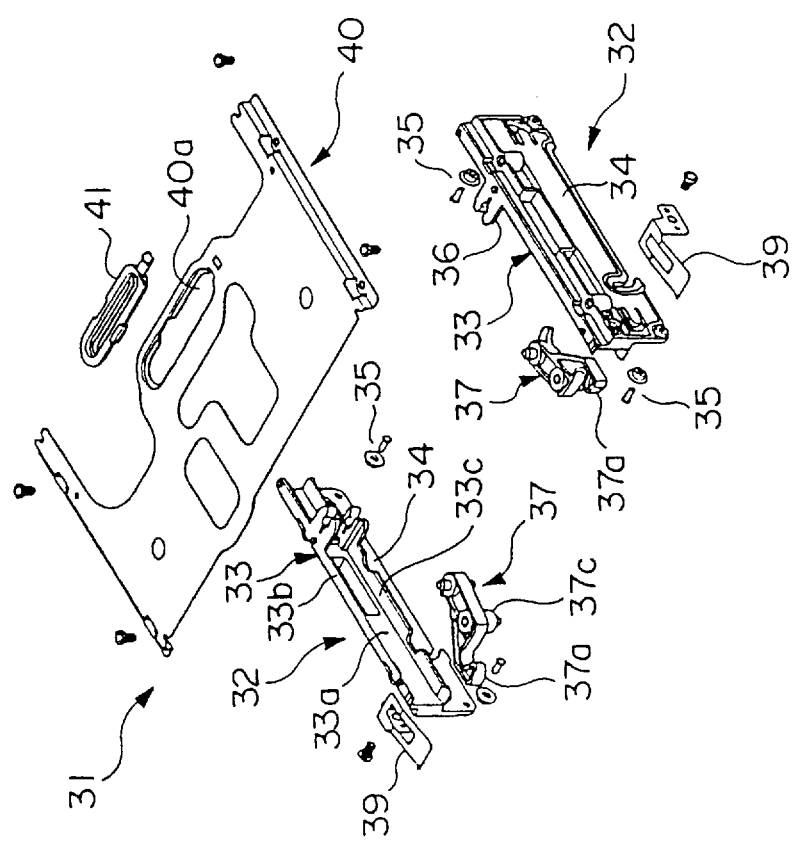
Figure 10:
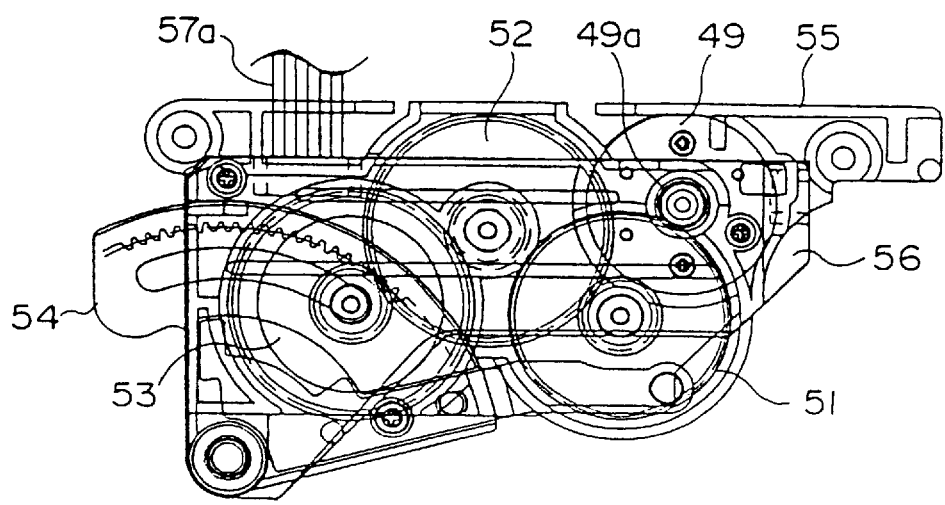
FIG. 10 is a top plan view of the drive mechanism constituting a part of the loading unit.
Figure 11:
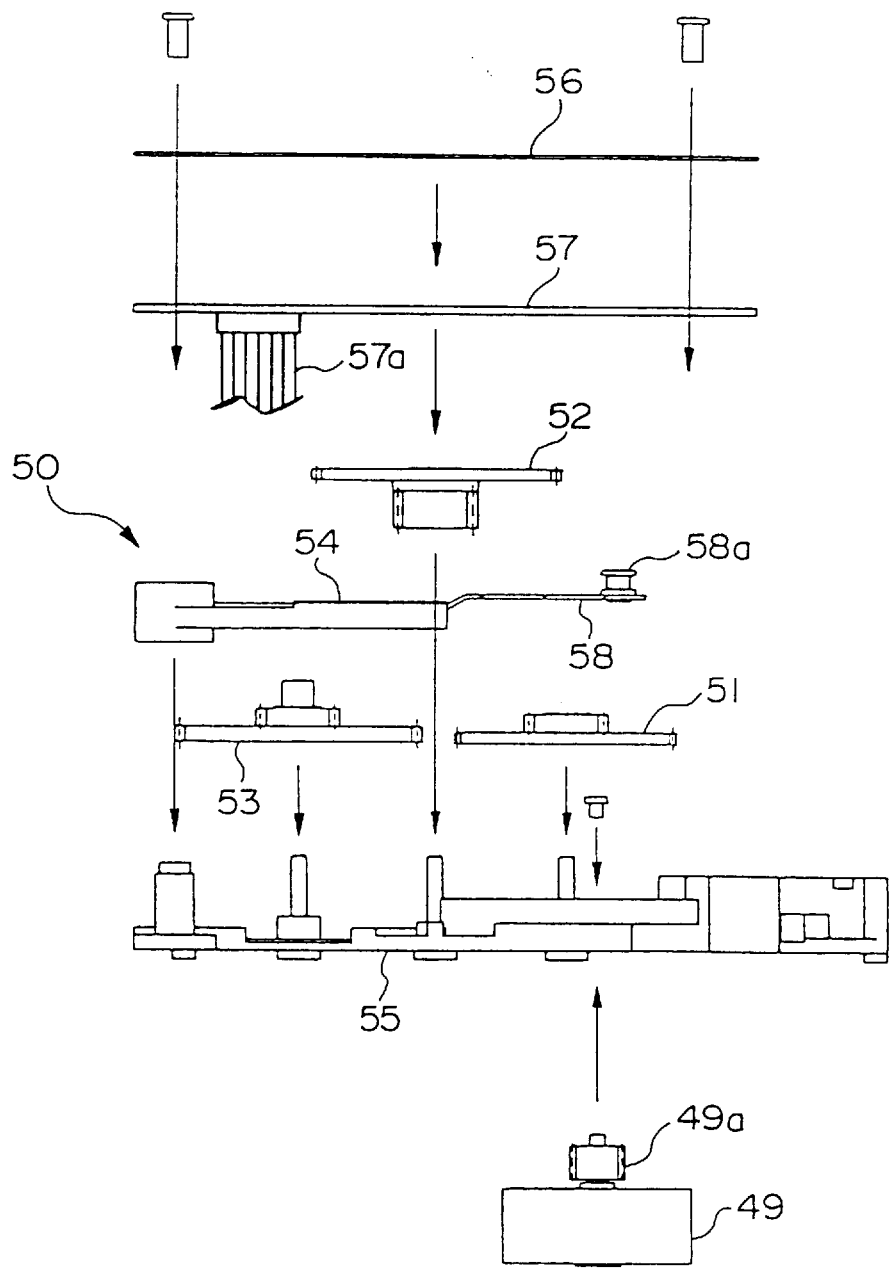
FIG. 11 is an exploded front view of the drive mechanism.
Figure 12:
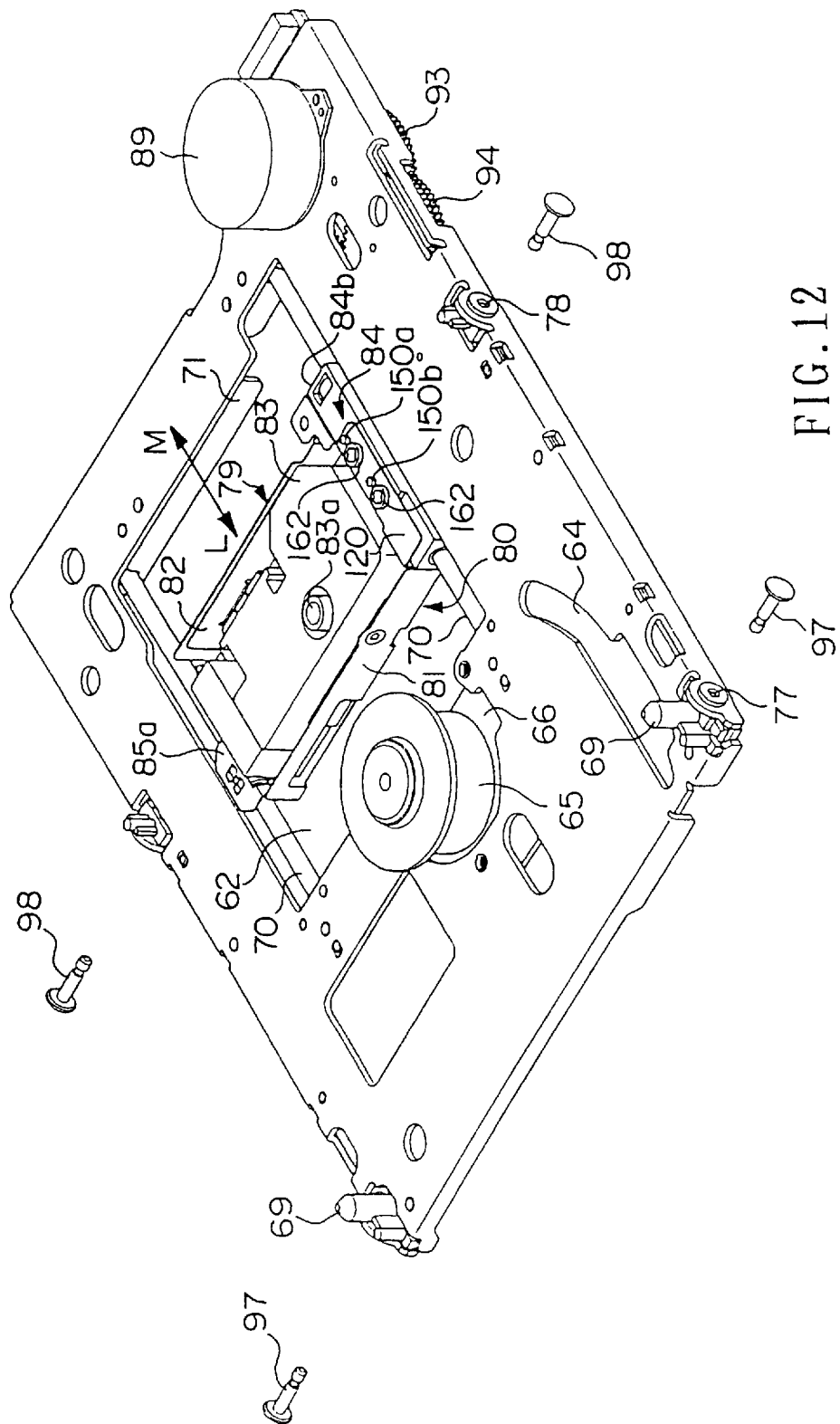
FIG. 12 is a perspective view of a traverse unit.

Referring now to FIGS. 6, 8 and 9, the loading unit 30 will be described.

The loading unit 30 includes a movable guide 31 which is provided for moving forwardly and rearwardly over the main chassis 11 and a drive mechanism 48 for driving this movable guide 31. The movable guide 31 has a pair of sliders 32 which are mounted on the bent portions 11a of the main chassis 11 movably along these bent portions 11a and a guide plate 40 connecting these sliders 32 together.

Each of the sliders 32 is formed in a generally rectangular shape extending in the forward and rearward direction and includes a guide section 33 and a lower plate section 34 formed under the guide section 33. The guide section 33 is formed in a generally C shape having a side plate section 33a, an inwardly extending upper holding plate section 33b and an inwardly extending lower holding plate section 33c and is adapted to receive the edge portion of the caddy C in the channel formed by these sections 33a, 33b and 33c. The lower plate section 34 extends vertically downwardly and continuously from the side plate section 33a. In the front and rear end portions of the lower plate section 34 are rotatably mounted rollers 35.

The sliders 32 are mounted to the main chassis 11 in such a manner that the sliders 32 hold the upper and lower edges of the bent portions 11a of the main chassis 11 with the lower holding plate sections 33c and the rollers 35 of the guide sections 33. The sliders 32 can be moved forwardly and rearwardly along the bent portions 11a. The lower holding plate section 33c is elastically deformable in the vertical direction and is formed on the lower surface in the front and rear portions thereof with minute projections (not shown). The lower plate section 34 is formed in the front and rear portions thereof with elastic pieces 34a. These elastic pieces 34a are also formed on the inside surface thereof with minute projections (not shown). These minute projections are brought into point contact and also sliding contact with the main chassis 11. By this arrangement, the sliding resistance produced by the movement of the movable guide 31 is reduced and the load applied to the sliders 32 in the vertical and leftward and rightward directions is absorbed by elastic deformation of the lower holding plate section 33c and elastic pieces 34a.

In the rear portion of each guide section 33, there is mounted a hook lever 37 through a support piece 36. This hook lever 37 is pivotably supported in its base portion by the support piece 36 and extends forwardly to form an inwardly projecting hook section 37a at its forward end portion. In a portion opposing the hook section 37a is formed a receiving surface 37b for receiving the caddy C. The hook lever 37 is adapted to be rotated with the movement of the movable guide 31 but its rotation is restricted in such a manner that its rotated position follows the hook cam slit 16 of the main chassis 11 due to a guide pin 37c which is fixedly provided in the central portion of the hook lever 37 and is engaged in the hook cam slit 16. In other words, when the movable guide 31 is at the foremost end eject position, the guide pin 37c is engaged in the eject section 16a of the hook cam slit 16 and the hook section 37a is located in an opening 33d formed in the side plate section 33a of the guide section 33 of the slider 32. At this time, the hook section 37a is not projecting inwardly from the inner surface of the side plate section 33a.

As the movable guide 31 is moved rearwardly (i.e., withdrawn) from the eject position, the guide pin 37c moves from the eject section 16a of the hook cam slit 16 to the oblique section 37c and the hook section 37a thereby is pivoted inwardly. When the guide pin 37c reaches the pull-in section 16c, the hook section 37a reaches, an inwardly projecting engaging position. Since the pull-in section 16c is formed in the direction of the movement of the movable guide 31, the guide pin 37c does not move laterally and therefore the engaging position of the hook section 37a is maintained. When the movable guide 31 moves forwardly (i.e., advances) from the engaging position, the hook lever 37 moves in a direction reverse to the above described movement.

In the left end portion of the eject lever 27 is pivotably connected, through a pivot pin, a front end portion of a transmission lever 38 which extends in the forward and rearward direction. The rear end portion of the transmission lever 38 is pivotably connected, through a pivot pin, to the guide pin 37c of the left side hook lever 37. As the movable guide 31 moves forwardly and rearwardly, the eject lever 27 is rotated through the transmission lever 38.

The lower plate section 34 of each slider 32 is formed in its lower end portion with a shallow recessed portion 34b along the lower edge of the lower plate section 34. In the front end portion of the recessed portion 34b is formed an upwardly extending support slit 34c which communicates with the recessed portion 34b. In the lower portion of the front side of the support slit 34c is formed a rearwardly extending lift up pawl 34d.

A forwardly extending clamp 39 is mounted to the front end portion of each slider 32. This clamp 39 is made of a leaf spring and, by elastically abutting to the upper surface of the caddy C inserted in the guide section 33, presses the caddy C downwardly. When the movable guide 31 moves to the eject position from the rear, the clamp 39 rides on the inclined surface 21a of the fixed guide 20 and does not abut against the upper surface of the inserted caddy C.

The guide plate 40 bridges and is fixed to the upper surfaces of the pair of sliders 32. Thus, the sliders 32 are connected to each other by the guide plate 40 and maintained in the same forward and rearward position with respect to the main chassis 11 by the guide plate 40. In the central portion of the guide plate 40 is formed an arm slit 40a extending in the leftward and rightward direction. A guide ring 41 is fitted in the arm slit 40a.

Referring to FIGS. 4 to 6 and FIGS. 9 to 11, the drive mechanism 48 of the loading unit 30 will be described.

The drive mechanism 48 is provided in the rear portion of the main chassis 11 and comprises as its principal component parts a loading motor 49 and a reduction gear group 50 rotated by the loading motor 49. The reduction gear group 50 consists of first, second, third and fourth gears 51, 52, 53 and 54. These gears are rotatably supported in a space defined by a gear base 55 fixed to the main chassis 11, a support plate 56 fixed to the gear base 55 and a base plate 57 disposed below the support plate 56. The base plate 57 is provided with a photosensor (not shown) detecting a rotated position of the fourth gear 54 and is also provided with a control circuit for controlling the operations of this photosensor and the loading motor 49. The loading motor 49 is fixed to the lower surface of the gear base 55. A drive gear 49a of the loading motor 49 is meshed with the first gear 51.

The fourth gear 54 is formed in a sectoral shape and its pivot portion is pivotably supported on the gear base 55. On the upper surface of the front end portion which extends straightly from the pivot portion of the gear 54 is fixed an arm 58 which extends along the end portion of the gear 54. This arm 58 projects by a predetermined length from the edge of the gear 54 and an arm pin 58a is provided in the foremost end portion of the arm 58. This arm pin 58a is slidably engaged in the guide ring 41 which is fitted in the arm slit 40a of the guide plate 40.

Figure 4:
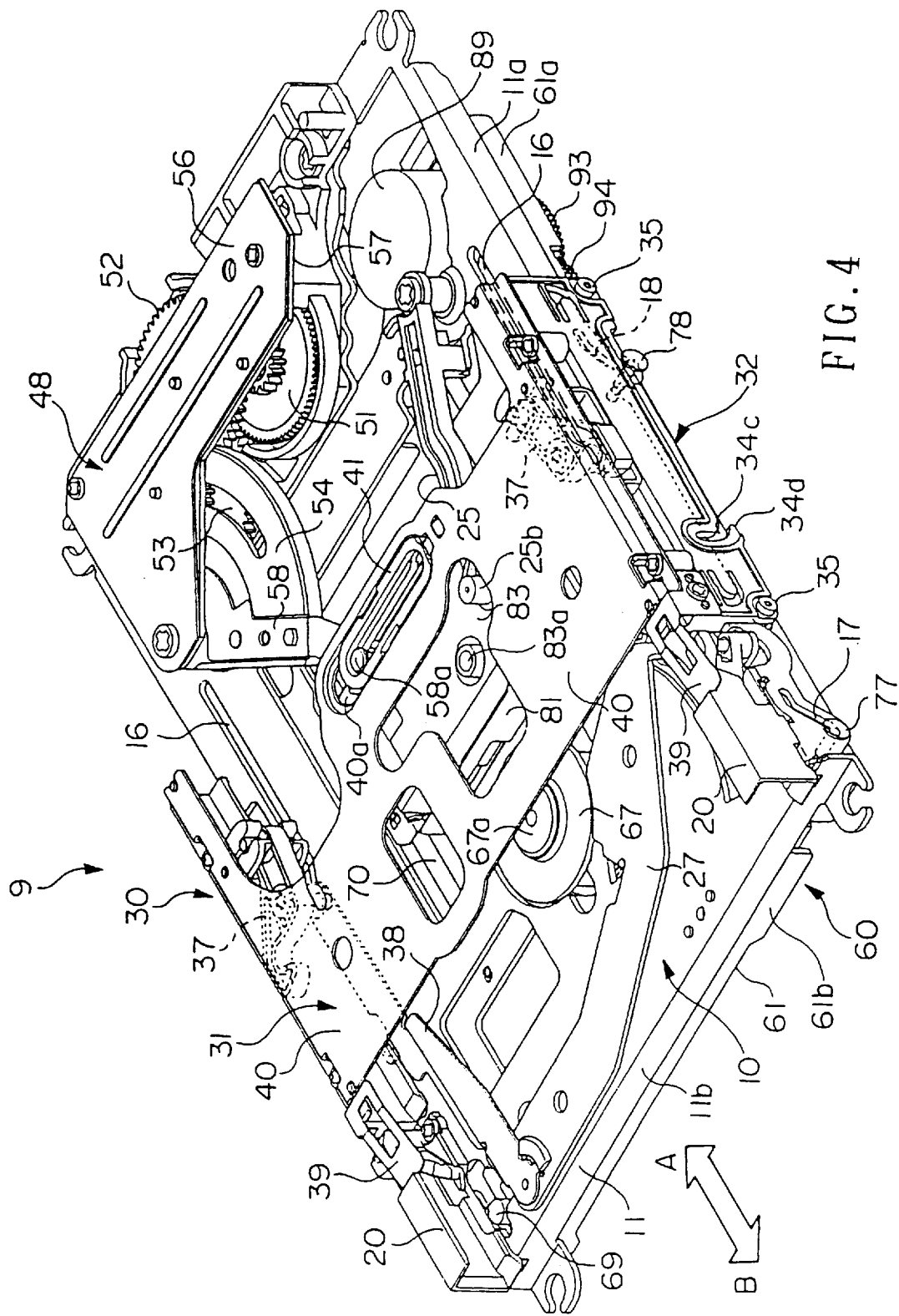
FIG. 4 is a perspective view showing the drive unit in the state in which a movable guide is at an eject position.
Figure 5:
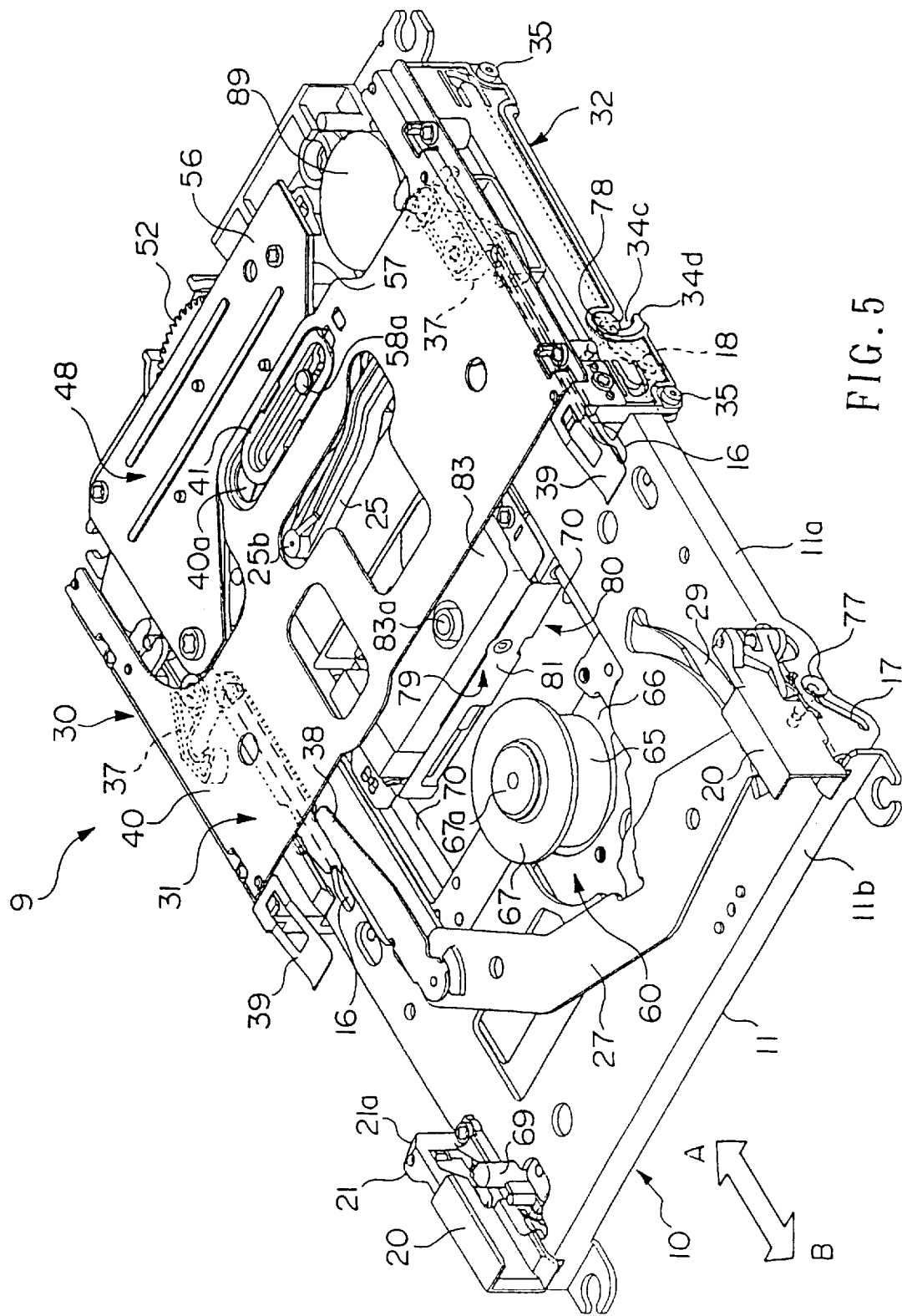
FIG. 5 is a perspective view showing the drive unit in the state in which the movable guide is at a drive position.

According to the loading unit 30, as shown in FIG. 4, when the loading motor 49 is forwardly rotated (i.e., in a withdrawing direction) with the movable guide 31 being at the eject position, the rotation of the loading motor 49 is transmitted sequentially from the first gear 51 to the second, third and fourth gears 52, 53 and 54 to rotate the fourth gear 54 in the direction of arrow J (FIG. 6). This causes the arm 58 to be rotated in the direction of the arrow J with the fourth gear 54 whereby the movable guide 31 is withdrawn to the disk drive position shown in FIG. 5. During this movement, the arm pin 58a slides rightwardly along the guide ring 41.

When the loading motor 49 is rotated reversely (i.e., in the advancing direction), the fourth gear 54 is rotated in the direction of arrow K. This causes the arm 58 to be rotated in the direction of the arrow K with the fourth gear 54 whereby the movable guide 31 advances forwardly. During this movement, the arm pin 58a slides leftwardly along the guide ring 41.

C. Traverse Unit

Referring to FIGS. 3 to 5, 12 and 13, the traverse unit 60 will now be described.

The traverse unit 60 is constructed of a traverse chassis 61 and a pickup device 80 mounted on the traverse chassis 61.

The traverse chassis 61 is made of a rectangular thin metal plate and is formed in its long edge portion and its short edge portion with bent portions 61a and 61b which are bent downwardly at a right angle. The traverse chassis 61 is formed with a central opening 62, a front recessed portion 63 and an arcuate slit 64 which correspond respectively to the central opening 12, the recessed portion 13 and the arcuate slit 29 of the main chassis 11. In the front end portion and a portion which is slightly rearward from the central portion of the bent portion 61a are formed guide pin insertion holes 77 and 78. The interval between these guide pin insertion holes 77 and 78 is the same as the interval between the cam slits 17 and 18.

A spindle motor 65 is provided in the semicircular front recessed portion 63. The spindle motor 65 is fixed to the lower surface of the traverse chassis 61 and projects slightly upwardly from the front recessed portion 63. A turntable 67 is fixed coaxially to an unillustrated drive shaft of the spindle motor 65. This turntable 67 is formed in an upwardly projecting shape in vertical section and the central projecting portion constitutes a chuck section 67a made of a magnet.

In the inside front portions of the bent portions 61a of the traverse chassis 61 are fixed guide bars 68. In the front end portions of these guide bars 68 are provided upwardly projecting positioning pins 69. These positioning pins 69 engage in the positioning holes 7 formed in the lower portion of the loaded caddy C when the caddy C has finally reached the disk drive position. The positioning pins 69 are designed to enter the positioning pin insertion holes 23 formed in the front end portion of the main chassis 11.

Figure 3:
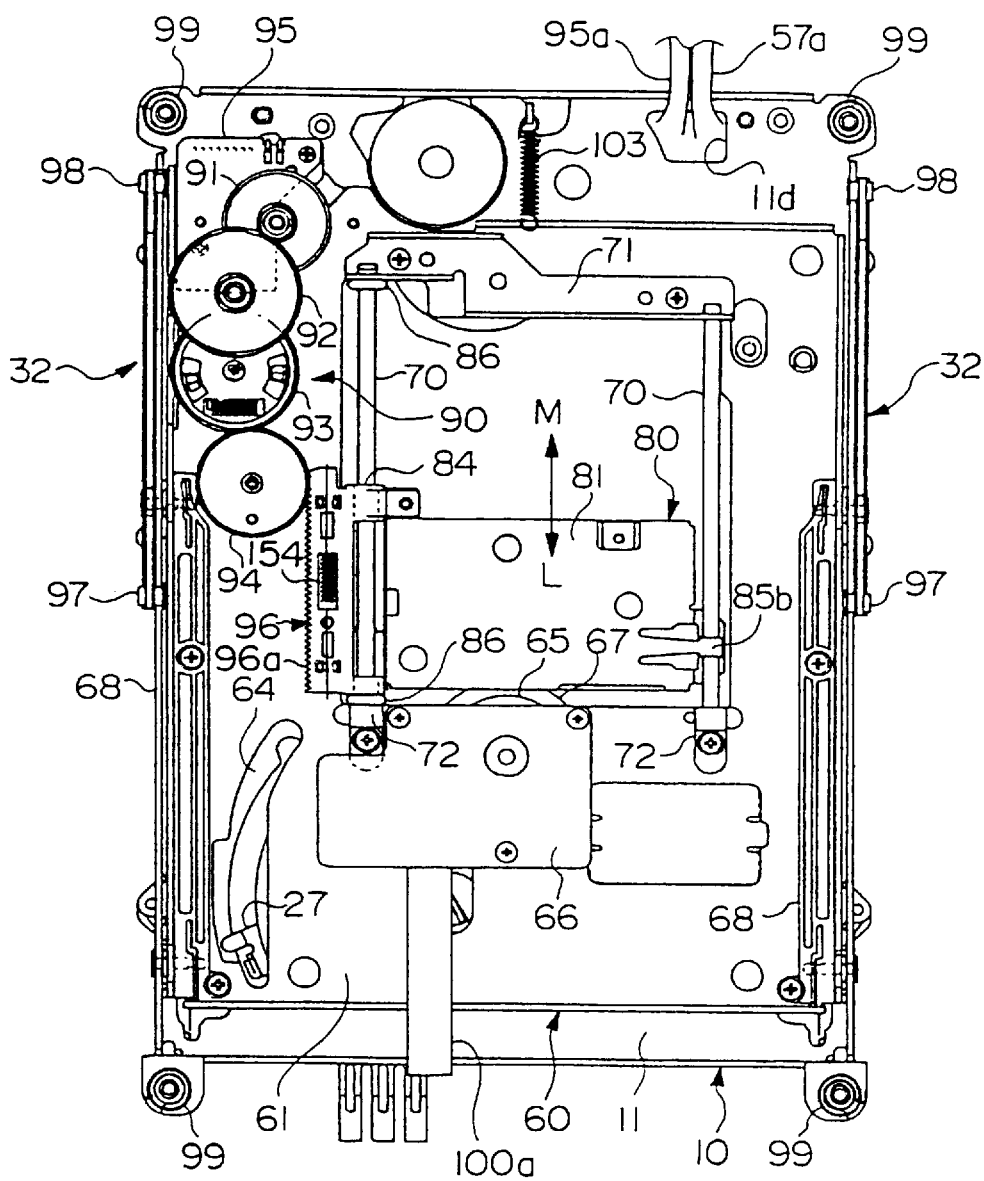
FIG. 3 is a bottom view of the drive unit.

A pair of guide shafts 70 extending in the forward and rearward direction are provided on both sides of the central opening 62. The pickup device 80 is slidable in the forward and rearward direction (in the direction of arrows L and M in FIGS. 2, 3 and 12) along the guide shafts 70. As shown in FIG. 3, the guide shafts 70 are fixed to the lower surface of the traverse chassis 61 through a support plate 71 and support holders 72.

The pickup device 80 has a head base 79 consisting of a rectangular dish-like first adjusting base 81 and a rectangular second adjusting base 82 and a holder 84 and a pickup head 83 which is mounted on the second adjusting base 82 of the head base 79. The holder 84 is fixed to the right side end portion in the longitudinal direction of the first adjusting base 81 and a vertically spaced pair of support pieces 85a and 85b are formed in the left side end portion of the first adjusting base 81. By inserting the right side guide shaft 70 in the hole 84a formed in the holder 84 and inserting the left side guide shaft 70 in a metal bearing 70a which is clamped between the upper and lower support pieces 85a and 85b, the pickup device 80 can slide in the forward and rearward direction along the guide shafts 70. The direction of movement of the pickup head device 80 is the radial direction of the loaded disk D. An object lens 83a for reading a signal on the disk D is provided in the pickup device 80. As shown in FIG. 3, cushions 86 made of rubber are provided at end portions of the right side guide shaft 70. By abutting engagement of the end surfaces of the holder 84 with the cushions 86, a shock to the pickup device 80 is absorbed.

Referring now to FIGS. 12 to 24, the head base 79 of the pickup device 80 will be described.

The first adjusting base 81 and the second adjusting base 82 constituting the head base 79 are made of a leaf spring material having a desired elasticity.

As shown in FIGS. 16 to 20, the first adjusting base 81 includes, as its main part, a dish-like base main body 115 which consists of a rectangular bottom plate section 110, a front wall section 111 and a rear wall section 112 rising at right angle from front and rear long edges of the bottom plate section 110, and a left wall section 113 and a right wall section 114 rising at right angle from left and right short edges of the bottom plate section 110. Recesses 116 are formed between respective adjacent wall sections. The respective wall sections 111, 112, 113 and 114 are adapted to be inclined outside and inside of the base main body 115 owing to their elasticity. In the bottom plate section 110, there are formed three circular openings 110a at predetermined locations. There is also provided a rectangular engaging hole 110b in the right center position of the bottom plate section 110.

Figure 19:
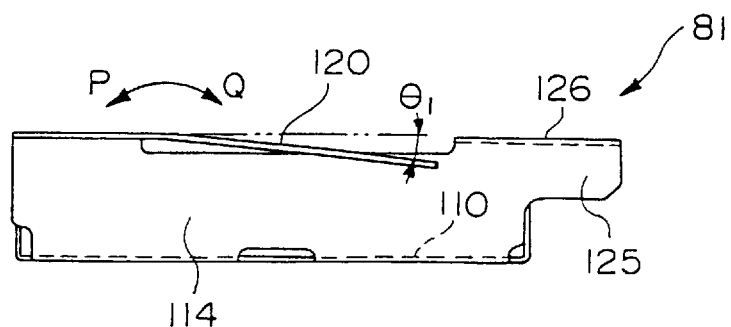
FIG. 19 is a right side view of the first adjusting base.

At the front upper edge portion of the right wall section 114 is formed integrally, through a bent section 121 bent at right angle, a fixed plate section 120 which is bent rightwardly and extending in the forward and rearward direction in parallel to the bottom plate section 110. The fixed plate section 120 is a portion fixed to the holder 84 and is formed with two positioning holes 122a, 122b and screw insertion holes 123a and 123b located forwardly of the positioning holes 122a, 122b. The centers of the front positioning hole 11b and the screw insertion hole 123b are substantially coincidental with the center line in the direction of the width of the fixed plate section 120 whereas the centers of the rear positioning hole 122a and the screw insertion hole 123b are slightly offset toward the base main body 115 by a distance x (e.g., 0.3 mm). In front of the front screw insertion hole 123b is formed a short slit 124 extending in the leftward and rightward direction. As shown in FIG. 19, the fixed plate section 120 is bent downwardly by an angle θ1 (about 10 degrees) from the portion where the slit 124 is located. At the rear of the right wall section 114 is formed an extending plate section 125 which extends rearwardly from the rear wall section 112. The upper edge portion of the extending plate section 125 and the rear portion of the right wall section 112 is bent leftwardly to form a first pressure supporting plate section 126 which is parallel to the bottom plate section 110. A screw insertion hole 126a is formed in the first pressure supporting plate section 126.

Figure 17:
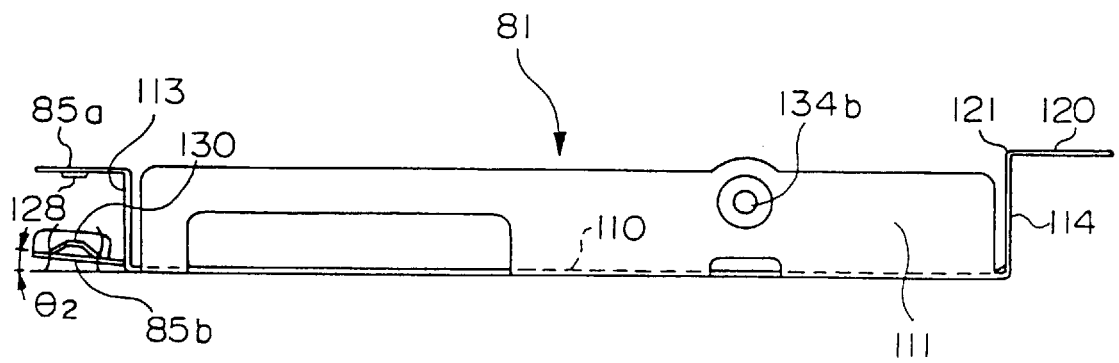
FIG. 17 is a front view of the first adjusting base.
Figure 20:
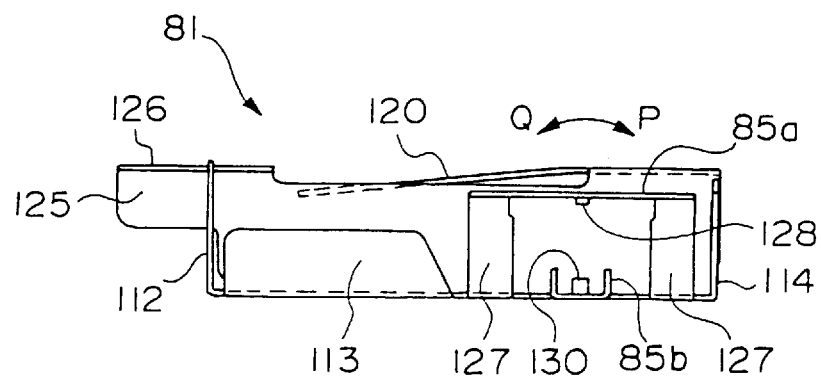
FIG. 20 is a left side view of the first adjusting base.

In the front portion of the left wall section 113 of the base main body 115 are formed, as shown in FIG. 20, a pair of front and rear small wall sections 127 and the upper support piece 85a is formed over the upper edges of the small wall sections 127. The support piece 85a is bent leftwardly from the upper edges of the small wall sections 127 in parallel to the bottom plate section 110. In the lower central portion of the support piece 85a is formed a projecting portion 128 which extends in the leftward and rightward direction. The lower support piece 85b which opposes the upper support piece 85a and constitutes a pair is formed at the foremost end portion of a projecting piece 129 which is formed in the left front portion of the bottom plate section 110 and projecting leftwardly. The lower support piece 85b is formed in the shape of the letter C in section opening upwardly and in the leftward and rightward direction and is formed with a projection 130. As shown in FIG. 17, the projecting piece 129 is is bent upwardly with an angle θ2 (e.g., 2 degrees) with respect to the bottom plate section 110.

Figure 16:
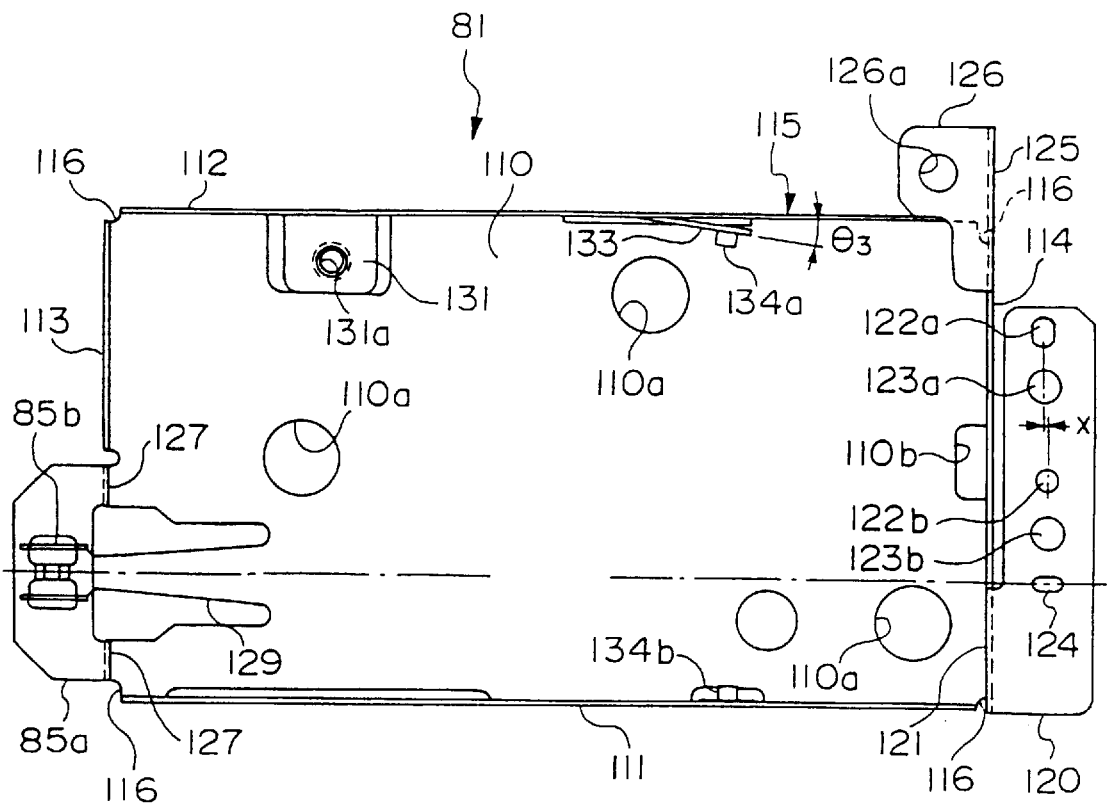
FIG. 16 is a top plan view of a first adjusting base which constitutes the head base of the pickup device.
Figure 18:
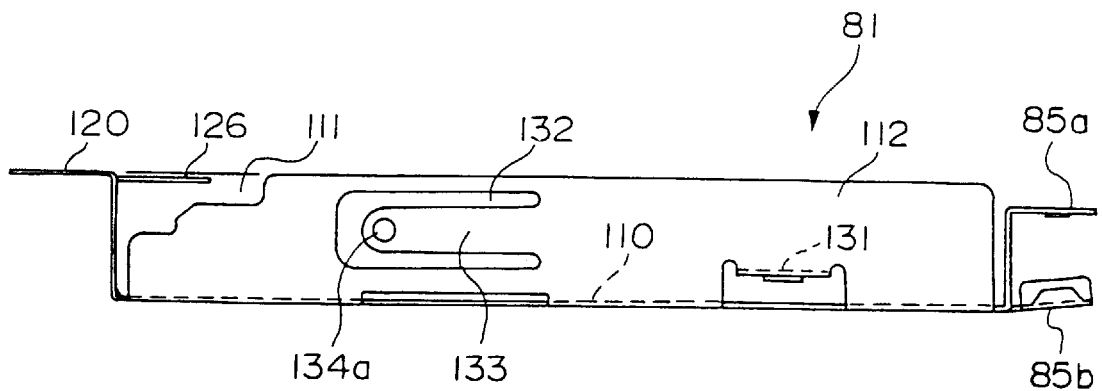
FIG. 18 is a rear view of the first adjusting base.

In the left end portion of the rear wall section 112 of the base main body 115 is formed an inwardly projecting support plate section 131. This support plate section 131 is parallel to the bottom plate section 110 and is formed in this central portion with a screw hole 131a. In a slightly right side portion of the central portion of the rear wall section 112 is formed, as shown in FIG. 18, a U-shaped slit 132 extending in the leftward and rightward direction and a rightwardly extending elastic piece 133 is thereby formed. An inwardly projecting pin 134a is fixed in the foremost end portion of the elastic piece 133. The elastic piece 133 is, as shown in FIG. 16, bent with an angle θ3 (about 3 degrees) with respect to the rear wall section 112 so that the foremost end portion thereof projects slightly inwardly. In the front wall section 111 of the base main body 115, a pin 134b opposing the pin 134a is fixed.

The second adjusting base 82 will now be described.

Figure 14:
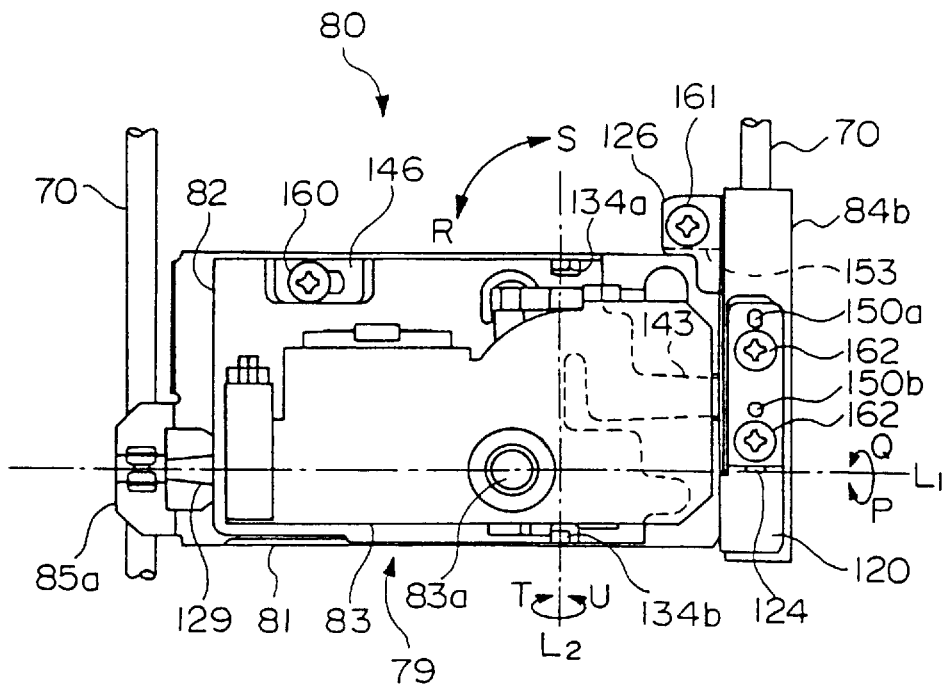
FIG. 14 is a top plan view of a pickup device.
Figure 21:
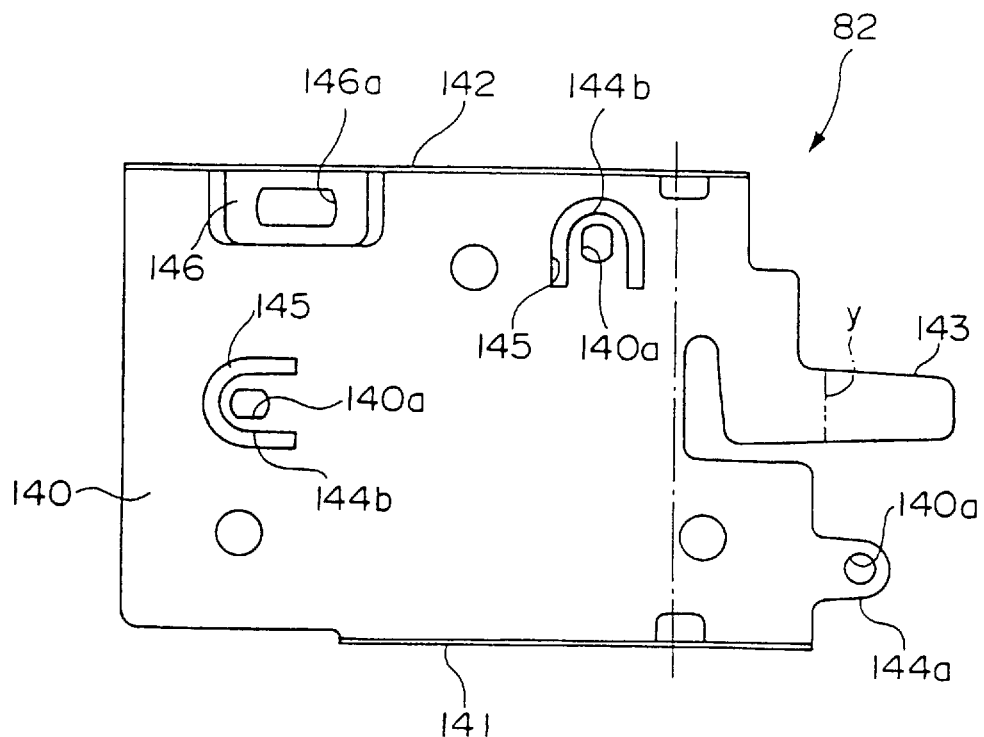
FIG. 21 is a top plan view of a second adjusting base which constitutes the head base of the pickup device.
Figure 22:
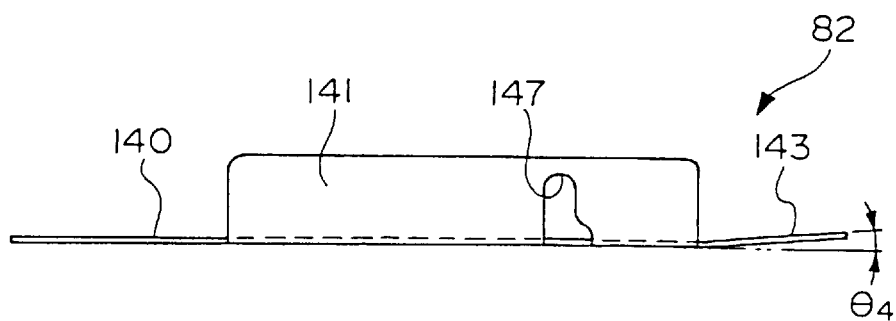
FIG. 22 is a front view of the second adjusting base.
Figure 23:
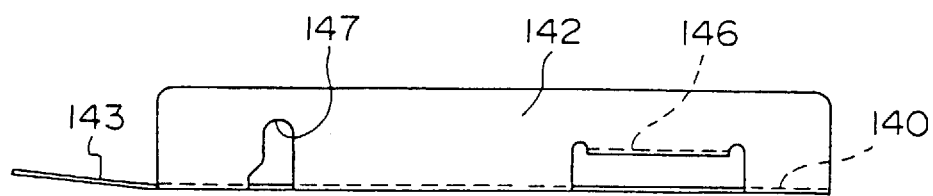
FIG. 23 is a rear view of the second adjusting base.
Figure 24:
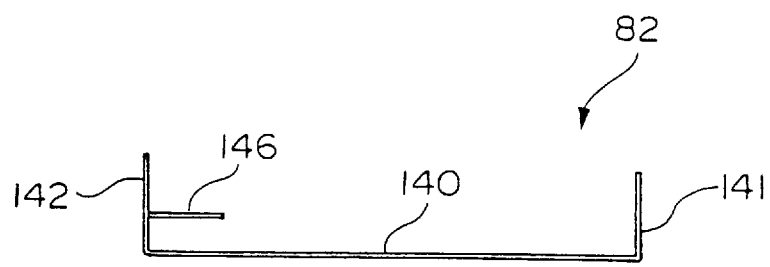
FIG. 24 is a left side view of the second adjusting base.
Figure 25:
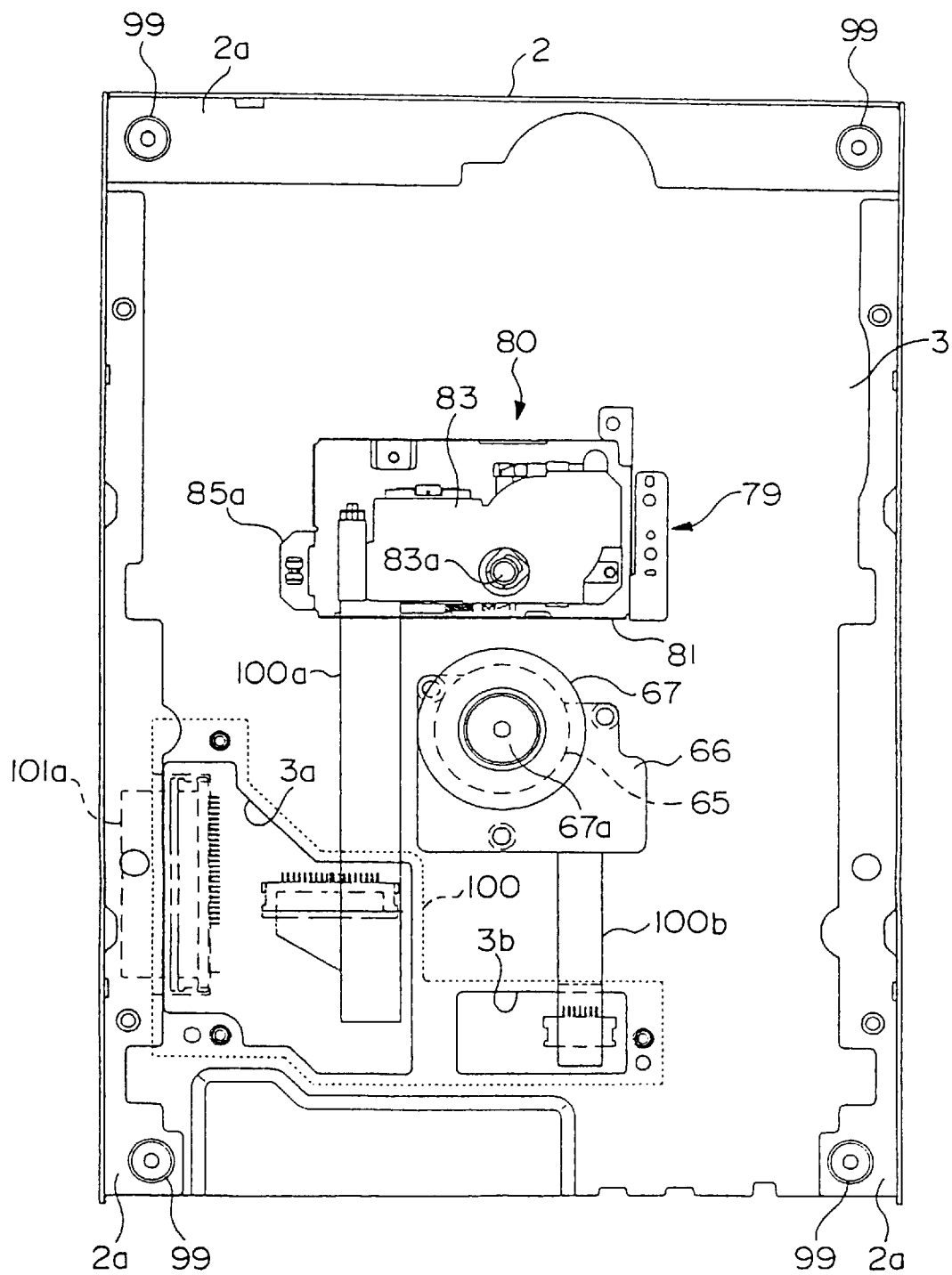
FIG. 25 is a top plan view showing a wiring structure to a pickup head and a spindle motor.
Figure 26:
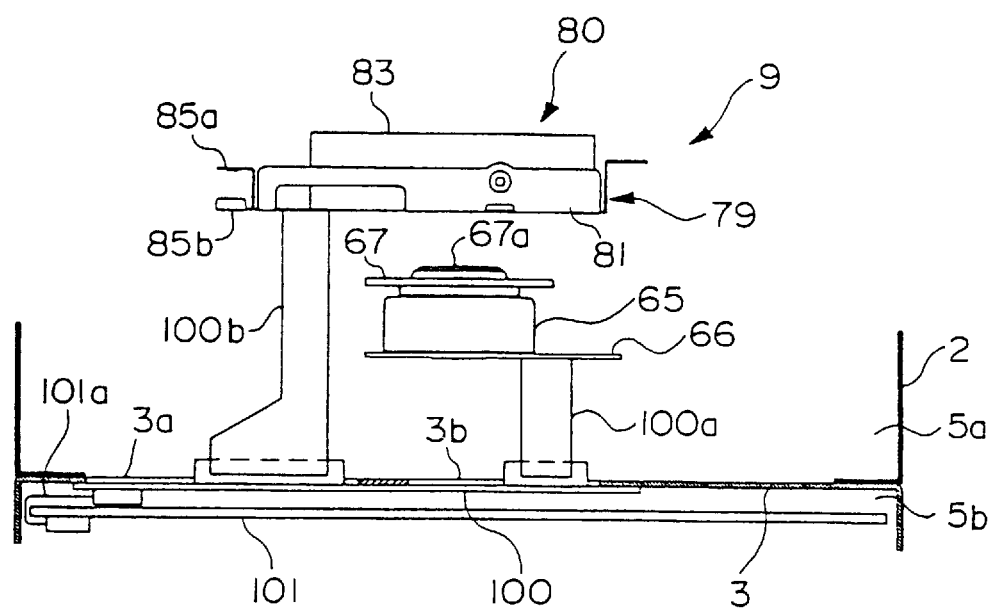
FIG. 26 is a front view of the wiring structure.

As shown in FIGS. 14 and 21, the second adjusting base 82 includes, as its main component part, a rectangular bottom plate section 140 formed smaller than the bottom plate section 110 of the first adjusting base 81. A front wall section 141 and a rear wall section 142 rise at right angle from front and rear long edges of the bottom plate section 140. In the right end portion of the bottom plate section 140 is integrally formed an L-shaped engaging plate section 143 which extends rightwardly. This engaging plate section 143 is bent upwardly at an angle 4 (about 3 degrees) with respect to the bottom plate section 140 from a bending edge y. In the bottom plate section 140 is formed with three openings 140a at predetermined three locations. These openings 140a are formed at locations corresponding to the opening 11a when the second adjusting base 82 is assembled with the first adjusting base 81. Among the openings 140a, the opening 140a in the right end portion is formed in the central portion of a rightwardly extending support piece 144a. The other two openings 140a are respectively formed in the central portions of support pieces 144b formed by U-shaped slits 145 in the bottom plate section 140.

In the left end portion of the rear wall section 143 is formed an inwardly projecting second pressure supporting plate section 146. This second pressure supporting plate section 146 is parallel to the bottom plate section 140 and a screw insertion hole 146a extending in the leftward and rightward direction is formed in the central portion of this section 146. Further, in the right end portions of the rear wall section 142 and the front wall section 141 are formed shaft insertion openings 147 which extend to the bottom plate section 140.

The holder 84 will now be described.

As shown in FIG. 3 and FIGS. 12 to 15, the holder 84 consists of a holder main body 84b extending in the forward and rearward direction and a rack gear 96 provided on the outer side of the holder main body 84b. On the upper surface of the holder main body 84 are formed positioning projections 150a, 150b and screw holes 151a, 151b corresponding to the positioning holes 122a, 122b and the screw insertion holes 123a 123b. These positioning projections 150a, 150b and the screw openings 151a, 151b are formed along the center line passing in the central portion of the upper surface of the holder 84 in the direction of width thereof. In the front portion of the upper surface of the holder 84 is formed a stepped portion 152 which reduces its thickness. The holder main body 84b is formed with an opening 84a extending in the forward and rearward direction thereof. In the rear end portion of the holder main body 84b is provided a leftwardly extending support section 152. This support section 153 is formed at a lower level than the holder main body 84b and an unillustrated opening is formed in the upper central surface thereof.

As shown in FIG. 13, the rack gear 96 consists of two gears, that is, a fixed gear 96a which is formed integrally in the lower portion of the outer surface of the holder main body 84b and a movable gear 96b which is provided on the fixed gear 96a slidably in the forward and rearward direction. The movable gear 96b is biased, as shown in FIG. 3, forwardly by a coil spring 154 provided between the gears 96a and 96b and, in this state, the teeth of the gears 96a and 96b are offset slightly in the forward and rearward direction. This arrangement prevents backlashing.

The first and second adjusting bases 81 and 82 and holder 84 are assembled together to form the head base 79 in the following manner.

The first adjusting base 81 is first fixed to the holder 84. For achieving this, the positioning holes 122a and 122b of the fixed plate section 120 are engaged with the positioning pins 150a and 150b on the upper surface of the holder main body 84b and screwns 162 inserted through the screw insertion holes 123a and 123b are screwed into the screw holes 151a and 151b. In this state, the first pressure supporting plate section 126 of the first adjusting base 81 opposes the support section 153 and the first screw (first adjusting member) 161 is screwed into the screw hole of the support section 153. In this state, there is a slight gap between the right wall section 114 of the first adjusting base 81 and the holder main body 84b.

Then, the pickup head 83 is placed on the second adjusting base 82 and fastened to the support pieces 144a and 144b by unillustrated screws which are inserted through the openings 110a and 140a from the back side.

Then, the right side guide shaft 70 is inserted through the holder 84 of the first adjusting base 81 and the left side guide shaft 70 which is inserted through a metal bearing 70a is clamped between the support pieces 85a and 85b and fixed through the support plate 71 and the support holder 72. Since the projecting piece 129 formed the foremost end portion of which constitutes the lower support piece 85b is bent upwardly at the angle θ2 with respect to the bottom plate section 110, the upper and lower support pieces 85a, 85b abut elastically to the shaft 70 inserted through the metal bearing 70a.

The left side guide shaft 70 is also in line contact with the projection 128 of the upper support piece 85a and also is in line contact with the front and rear upper edges of the lower support piece 85b and the projection 130, the sliding resistance of the guide shaft 70 is very low. Further, since the front and rear upper edges of the projection 128 and support piece 85b extend in the leftward and rightward direction, the metal bearing 70a can clamp the guide shaft 70 accurately even if there are mounting error and assembly error in the leftward and rightward direction.

Lastly, the second adjusting base 82 is assembled to the first adjusting base 81. For this purpose, the engaging plate section 143 of the second adjusting base 82 is inserted in the engaging opening 110b of the bottom plate section 110 and the pins 134a, 134b are inserted in the front and rear pin insertion holes 147. In this state, the second pressure supporting plate section 146 of the second adjusting base 82 opposes the support plate section 131 of the first adjusting base 81 and the second screw (second adjusting member) 160 inserted through the screw hole 146a of the pressure supporting plate section 146 is screwed into the screw hole 131a of the support plate section 131.

The head base 79 is assembled in the above described manner. By assembling the device in this order, service efficiency in exchange of the pickup is remarkably improved.

According to this pickup device 80, the base main body 115 on which the pickup head 83 is mounted can be slightly moved vertically by elastic deformation of the right side bent portion 121 and the left side upper and lower support pieces 85a, 85b.

The base main body 115 of the first adjusting base 81 can be pivoted slightly in the direction of arrows P and Q in FIGS. 19 and 20 about a first pivot axis L1 extending in the leftward and rightward direction through the slit 124 of the fixed plate section 120. The first pivot axis L1 crosses the moving direction of the pickup device 80 at right angle, is substantially parallel to the disk surface and passes over the support pieces 85a, 85b and the object lens 83a of the pickup head 83. The front portion before the slit 124 of the fixed plate section 120 has a gap with respect to the holder main body 84b due to the stepped portion 152, the pivoting is permitted. Further, since the fixed plate section 120 which is bent downwardly by the angle θ1 is fixed to the holder 84, the base main body 115 is inclined forwardly by the angle θ1 about the first pivot axis L1. However, the first pressure supporting plate section 126 is pressed by the head portion of the first screw 161 and, therefore, the base main body 115 maintains a substantially horizontal posture. In other words, the base main body 115 is constantly biased in the forwardly inclining direction by elasticity of the fixed plate section 120 and the biasing pressure is supported by the first pressure supporting plate section 126 which abuts against the head portion of the first screw 161 whereby shaking of the base main body 115 is prevented. When the first screw 161 is screwed, the first pressure supporting plate section 126 is lowered and the base main body 115 is pivoted in the rearwardly inclining direction (i.e., direction of the arrow Q) whereas when the first screw 161 is unscrewed, the first pressure support plate section 126 is elevated following rising of the head portion of the first screw 161 so that the base main body 115 is pivoted in the forwardly inclining direction (i.e., direction of the arrow P).

Figure 15:
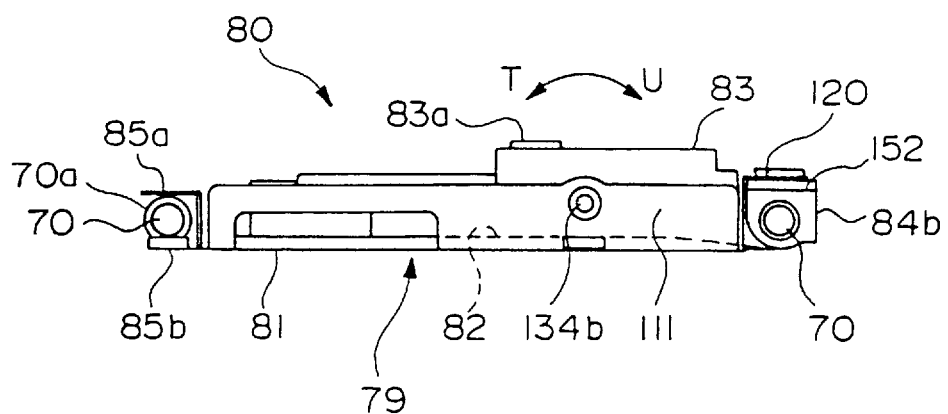
FIG. 15 is a front view of the pickup device.

As shown in FIG. 15, the base main body 115 can be slightly pivoted about the bent portion 121 in the direction of arrows R and S which is parallel to the disk surface. Since the positioning hole 122a and the screw insertion hole 123a in the rear portion of the fixed plate section 120 are offset by the distance x on the side of the base main body 115, by compulsorily bringing them into alignment with the positioning pin 150a and the screw hole 151a and fastening them by the screw, the base main body 115 is pivoted about the bent portion 121 to the side of the holder 84 (in the direction of the arrow S) so that the rear portion of the front wall section 111 abuts against the holder main body 84b. In other words, the base main body 115 is constantly biased toward the holder 84 (in the direction of the arrow S) due to elasticity of the bent portion 121 whereby shaking of the base main body 115 is prevented and, from this state, the base main body 115 is slightly pivotable in the direction of the arrow R against the biasing force.

As to the second adjusting base 82, the engaging plate section 143 which is bent upwardly by the angle θ4 is inserted in the engaging opening 110b formed in the bottom plate section 110 of the first adjusting base 81 and, accordingly, the second adjusting base 82 is slightly spaced from the upper surface of the bottom plate section 110 and is slightly pivotable about the second pivot axis L2 which passes over the front and rear pins 134b, 134a in the direction of the arrows T and U of FIG. 15. The second pivot axis L2 crosses the first pivot axis L1 and is parallel to the disk surface. However, since the second pressure supporting plate section 146 is pressed by the head portion of the second screw 160, pivoting in the direction of the arrow U is restricted. That is, the second adjusting base 82 is constantly biased in the direction of the arrow U by elasticity of the engaging plate section 143 and the biasing pressure is supported by the second pressure supporting plate section 146 which abuts against the head portion of the first screw 161 whereby shaking is prevented. When the second screw 160 is screwed, the second pressure supporting plate section 146 is lowered and the second adjusting base 82 is pivoted in the direction of the arrow T whereas when the second screw 160 is unscrewed, the second pressure supporting plate section 146 is elevated following the rising head portion of the second screw 160 and the second adjusting base 82 is pivoted in the direction of the arrow U. Further, the second adjusting base 82 is biased forwardly by the elastic piece 133 of the first adjusting base 81 whereby its shaking in the direction of the second pivot axis L2 is prevented.

The pickup head 83 is pivoted with the first and second adjusting bases 81 and 82 about the first and second pivot axes L1 and L2 and the optical axis of the object lens 83 is thereby inclined. More specifically, when the first adjusting base 81 is pivoted about the first pivot axis L1, the optical axis is inclined in the radial direction of the disk D and, when the second adjusting base 82 is pivoted about the second pivoting axis L2, the optical axis is inclined in the circumferential direction of the disk D. A method for adjusting the inclination will be described later.

The pickup device 80 is moved by a pickup drive mechanism 88. This pickup drive mechanism 88 is provided in the right rear end portion of the traverse chassis 61 and comprises, as its main component parts, a feed motor 89 and a reduction gear group 90 which are rotated by the feed motor 89.

The reduction gear group 90 consists, as shown in FIGS. 3 and 13, of first, second, third and fourth gears 91, 92, 93 and 94 and are rotatably supported on the lower surface of the main chassis 11. The first gear 91 is meshed with a drive gear 89a of the feed motor 89 fixed to the traverse chassis 61. The third and fourth gears 93 and 94 are respectively composed of two wheels. To the lower surface of the traverse chassis 61 is fixed a substrate 95 including a control circuit for controlling the operation of the feed motor 89. The fourth gear 94 is meshed with a rack gear 96 provided on the outer side surface of the holder 84.

According to the pickup drive mechanism 88, when the feed motor 89 is forwardly rotated (i.e., in the scanning direction) from the state in which the pickup device 80 is at the foremost end position, the rotation of the feed motor 89 is sequentially transmitted from the first gear 91 to the second, third and fourth gears 92, 93 and 94 causing the fourth gear 94 to be rotated in the direction of the arrow J. This causes the pickup device 80 to be withdrawn with the holder 84. When the feed motor 89 is rotated in a reverse direction (reverse to the scanning direction), the fourth gear 94 is rotated in the direction of the arrow K and the pickup device 80 thereby advances forwardly.

The above description has been made about the chassis unit 10, loading unit 30 and traverse unit 60 constituting the drive unit 9. To the chassis unit 10 on which the loading unit 30 is mounted, the traverse unit 60 is mounted in the following manner.

The traverse unit 60 is disposed below the main chassis 11. The bent portions 61a and 61b of the traverse unit 60 are located inside of the bent portions 11a and 11b of the main chassis 11. The front and rear guide pin insertion holes 77 and 78 are brought into register with the cam slits 17 and 18 and the guide pins 97 and 98 are inserted from outside to these holes 77 and 78 and the cam slits 17 and 18. The guide pins 97 and 98 have head portions 97a and 98a of a larger diameter in their outer end portion and, by engagement of their inner end portions in the guide bars 68, they become integral with the traverse chassis 61. The rear guide pins 98 abut against the lower surface of the recessed portion 34b of the lower plate section 34 of the sliders 32 and, as the movable guide 31 is withdrawn, are lifted up by the lift up pawl 34d to be led to the support slits 34c. As shown in FIG. 3, a spring 103 is provided between the rear end portion of the traverse chassis 61 and the rear bent portion 11b of the main chassis 11 so as to constantly bias the traverse unit 60 rearwardly.

As shown in FIG. 1, the drive unit 9 is fixed in such a manner that flange portions 11c formed in four corners of the main chassis 11 are placed on support sections 2a formed in the lower portion of the main frame 2 through rubber dampers 99 and the two rear dampers 99 are pressed by the top cover and the front rubber dampers 99 are pressed by the unillstrated front frame.

As shown in FIG. 1, the under frame 3 which divides the drive unit chamber 5a receiving the drive unit 9 and the substrate chamber 5b is provided below the drive unit 9 and is fixed to the support sections 2a. As shown in FIGS. 14 and 15, the under frame 3 covers the space below the main frame 2. This under frame 3 is formed at its predetermined locations with relay openings 3a and 3b which communicate the drive unit chamber 5a and the substrate chamber 5b with each other. These relay openings 3a and 3b are closed by a relay substrate 100 which is fixed to the lower surface of the under frame 3. A main substrate 101 is fixed in the substrate chamber 5b below the under frame 3 with an interval from the under frame 3. In this main substrate 101 is formed a control circuit for controlling operations of the spindle motor 65 and the pickup head 83 etc. FPC 101a which is wiring of the main substrate 101 is connected to the relay substrate 100 through a gap between the main substrate 101 and the under frame 3. The relay substrate 100 is connected to the spindle motor 65 and the pickup head 83 through FPC 100a and FPC 100b.

As shown in FIG. 1, the bottom cover 4b is fixed to the under frame 3 and the casing 4 for the disk drive device is constructed of the bottom cover 4b, the top cover 4a and the unillstrated front panel covering the front opening. The unillustrated front panel and front frame are formed with a caddy insertion opening for inserting the caddy C into the disk drive device. The bottom cover 4b is formed with unillstrated heat dissipating openings.

As shown in FIG. 3, the main chassis 11 is formed with a wiring opening 11d for leading wirings 57a and 59a of the substrates 57 and 95 downwardly. The wirings 57a and 95a led out of the wiring opening 11d are further led through the under frame 3 and connected to the relay substrate 100 through the gap between the main substrate 101 and the under frame 3.

An eject pin 102 extending in the forward and rearward direction is provided in the front right portion of the under frame 3. This eject pin 102 is slidable in the forward and rearward direction and is biased forwardly by an unillstrated spring. As the eject pin 102 is pushed rearwardly when the movable guide 31 is at the disk drive position (withdrawn position), the pin 102 abuts against the engaging pawl 27b of the eject lever 27 to further push the movable guide 31.

(2) Operation of the Embodiment

The operation of the disk drive device of the above described structure and advantageous results derived therefrom will now be described.

A. The Entire Disk Device

When the caddy C is not loaded in the disk drive device, the movable guide 31 is always at the foremost end eject position. The eject position of the movable guide 31 is determined by engagement of the guide pins 37c of the hook levers 37 with the front edges of the hook cam slits 16. At this time, the hook sections 37a of the hook levers 37 are received in the openings 33d of the guide sections 33 of the sliders 32.

The traverse unit 60 is stopped at its foremost end position by engaging of the front and rear guide pins 97 and 98 in the stop hole sections 17a and 18a of the front and rear cam slits 17 and 18 of the main chassis 11. Since the stop hole sections 18a of the rear cam slits 18 are not extending in the forward and rearward direction, the rear guide pins 98 are restricted in their movement in the forward and rearward direction. By this arrangement, the traverse unit 60 is stopped in a stable state.

The clamp 39 is on the inclinating surface 21a of the fixed guide 20 and the arm 58 of the loading unit 30 is located at a front position with its arm pin 58a located in the leftward-most position in the guide ring 41 and the open lever 25b extends forwardly. The right end portion of the eject lever 27 is located rearwardly.

The caddy C is now inserted into the disk drive device from this state in which the movable guide 31 is at the eject position. The caddy C is inserted from the end portion in which the shutter 8 is provided with the shutter 8 facing downwardly. The rear end portion of the caddy C comes into abutting engagement at both sides thereof with the receiving surfaces 37b of the hook levers 37. As the caddy C is further pushed in, the movable guide 31 is withdrawn and the guide pins 37c which are guided along the hook cam slits 16 are rotated inwardly whereby the hook sections 37a engage in the hook holes 6 of the caddy C. The caddy C thereby is received by the movable guide 31 and is withdrawn with the movable guide 31. The pin 25b at the foremost end portion of the open arm 25 engages with the shutter 8 to gradually open the shutter 8. As the movable guide 31 is withdrawn, the arm 58 is withdrawn rearwardly whereby the fourth gear 54 of the drive mechanism 48 is rotated in the direction of the arrow J. When the fourth gear 54 has reached a certain rotated position, a drive signal is given from the photosensor provided in the substrate 57 to the loading motor 49 and the loading motor 49 thereby starts a forward rotation. From this point, the movable guide 31 is pulled in rearwardly by the arm 58 by further rotation of the fourth gear 54 in the same direction. That is, the movable guide 31 is withdrawn by the force of the loading motor 49.

In the course of this withdrawal, the lift up pawls 34d of the sliders 32 engage with the rear guide pins 98. The pins 98 which are guided along the support slits 34c are elevated and withdraw while they are elevated along the rear cam slits 18. The front guide pins 97 withdraw while being elevated along the front cam slits 17. In this manner, by withdrawal of the front and rear guide pins 97 and 98 while being elevated along the front and rear cam slits 17 and 18, the traverse unit 60 as a whole is elevated while approaching the main chassis 11 and withdrawing with the movable guide 31.

In this case, the front and rear guide pins 97 and 98 are elevated from the stop hole sections 17a, 18a of the front and rear cam slits 17 and 18 along the lift up sections 17b and 18b. Since the lift up sections 18b of the rear cam slits 18 rise with the inclination angle which is larger than the inclination angle of the lift up sections 17b of the front cam slits 17, the traverse unit 60 withdraws in an inclined posture with its rear end portion being lifted up. Alternatively stated, the interval between the traverse unit 60 and the main chassis 11 becomes gradually larger from the rear end portion toward the front end portion. As the front and rear guide pins 17 and 18 approach the pull-in sections 17c and 18c, the height of the front end portion of the traverse chassis 61 approaches the height of the rear end portion thereof and, when the guide pins 97 and 98 have entered the pull-in sections 17c and 18c, the traverse chassis 61 becomes parallel to the main chassis 11. Thereafter, when the guide pins 97 and 98 have withdrawn to the disk drive position of the caddy C at which the guide pins 97 and 98 abut against the rear edges of the pull-in sections 17c and 18c, the loading motor 49 is stopped. The traverse unit 60 is withdrawn by the loading motor 49 and the pulling force of the spring 103.

In the course of the movement of the traverse unit 60 to the disk drive position, the turntable 67 withdraws while being gradually elevated with the behaviour of the traverse chassis 61. At the disk drive position, the turntable 67 enters the front recessed portion 13 of the main chassis 11 and the central chuck section 67a is sucked to the portion-to-be-chucked which is the central portion of the disk D. The positioning pins 69 also are elevated and enter the positioning holes 7 of the caddy C through the positioning pin insertion holes 23 whereby the caddy C is held in position. Further, as the caddy C withdraws, the open arm 25 is rotated in the direction of the arrow E to open the shutter 8. The eject lever 27 is rotated in the direction of the arrow H to position the engaging pawl 27b at the front position.

When a disk drive order is given in this state, the spindle motor 65 is rotated to rotate the disk D. The feed motor 89 also is rotated to displace the pickup device 80 in the direction of the arrow M or L. This causes the pickup head 83 to read a signal from the recording surface of the disk D or write a signal on the recording surface of the disk D through the opening of the caddy C which has been opened by the open arm 25.

When driving of the disk D is stopped and an order to take out the caddy C is given, the loading motor 49 is rotated reversely and the movable guide 31 is pushed by the arm 58 which is rotated in the direction of the arrow K with the fourth gear 54 whereby the caddy C is caused to advance with the movable guide 31 in an operation which is reverse to the loading operation. In this advance course, when the guide pins 97 and 98 advance in the pull-sections 17c and 18c of the front and rear cam slits 17 and 18, the movable guide 31 and the traverse unit 60 advance in parallel to the main chassis 11. Thereafter, the traverse unit 60 advances to the eject position with the front end portion of the traverse unit 60 being spaced apart from the main chassis 11 earlier than the rear end portion of the traverse unit 60. At the eject position, the hook sections 37a of the hook levers 37 are disengaged from the hook holes 6 of the caddy C and the front end portion of the caddy C comes out of the device, so that the caddy C can be taken out of the device.

In a case where, for some reason, the movable guide 31 does not advance and therefore the caddy C cannot be taken out of the device, the caddy C can be compulsorily taken out by pushing in the eject pin 102 rearwardly. Upon pushing in of the eject pin 102, the rear end surface of the eject pin 102 abuts against the engaging pawl 27b of the eject lever 27 and, by pushing in the eject pin 102 further, the eject lever 27 is rotated in the direction of the arrow G and the transmission lever 38 pulls the movable guide 31 forwardly through the guide pins 37c of the hook levers 37. The caddy C thereby is caused to advance compulsorily to the eject position.

According to the above described disk drive device, when the movable guide 31 which has received the inserted caddy C withdraws and, in the course of this withdrawal, the traverse unit 60 is engaged with the movable guide 31 and withdraws with the movable guide 31, the traverse unit 60 withdraws with its angle of inclination becoming gradually smaller from the inclined state in which the front end portion of the traverse unit 60 is lower than the rear end portion thereof and becomes parallel to the main chassis 11 at the disk drive position. By this withdrawing operation of the traverse unit 60, the turntable 67 approaches the portion-to-be-chucked of the disk D relatively from beneath the portion-to-be-chucked and is sucked to it by slightly pivoting at a position immediately before the disk drive position. Accordingly, there is no substantial change in the angle in the operation for causing the turntable 67 to be sucked to the disk D but the turntable 67 is sucked to the disk D with a series of continuous operation. Thus, mulfunctioning in chucking of the disk D to the turntable 67 is not likely to occur and the disk D can be always driven accurately. Besides, in taking out the disk D, after the turntable 67 is moved slightly forwardly, it is pivoted so that the front end portion is lowered and, therefore, the turntable 67 is disengaged smoothly from the disk D and a driving force necessary for disengaging the turntable 67 from the disk D can be minimized.

Since the hook sections 37a of the hook levers 37 are engaged with the hook holes 6 provided on both sides of the caddy C and the caddy C is pulled in together with the movable guide 31, the caddy C is moved to the disk drive position maintaining a correct posture. Hence, the disk D can always be positioned accurately whereby the effect of preventing mulfunctioning in chucking is enhanced.

B. The Pickup Device

The operation and advantageous results of the pickup device will now be described. A method for adjusting the optical axis of the object lens 83a of the pickup head 83 will be described with respect to inclination in the radial direction and inclination in the circumferential direction of the disk D.

For performing the adjustment of the optical axis in the radial direction of the disk D, the first screw 161 is turned to cause the first pressure supporting plate section 126 to engage the support section 153 or disengage therefrom. The first adjsuting base 81 is thereby pivoted about the first pivot axis L1 in the direction of the arrows P and Q and the pickup head 83 is pivoted in the same direction and the optical axis is inclined in the radial direction of the disk D. Therefore, by turning the second screw 160 suitably to adjust the position of the first pressure supporting plate section 126, the optical axis can be adjusted to cross the disk surface in the radial direction of the disk D.

For performing adjustment of the optical axis in the circumferential direction of the disk D, the second screw 160 is turned to cause the second pressure supporting plate section 146 to engage the support plate section 131 or disengage therefrom. The second adjusting base 82 is thereby pivoted about the second pivot axis L2 in the direction of the arrows T and U and the pickup head is pivoted in the same direction and the the optical axis is inclined in the circumferential direction of the disk D. Therefore, by turning the second screw 160 suitably to adjust the position of the second pressure supporting plate section 146, the optical axis can be adjusted to cross the disk surface in the circumferential direction of the disk D.

As described above, according to the pickup device 80 of the present embodiment, the optical axis of the pickup head 83 can be made simply by turning of the screws 150 and 161 so that the adjusting operation is facilitated.

By slight pivoting of the first adjusting base 81 about the first pivot axis L1 and slight pivoting of the second adusting base 82 about the second pivoting axis L2, shock to the pickup head 83 can be absorbed. Further, since the first adjusting base 81 can be pivoted also in the direction of the arrows R and S which is parallel to the disk surface, when the pickup device 80 has stopped after moving at a high speed, inertia produced by this stopping is not transmitted directly to the pickup head 83 and therefore shock is absorbed in this case also.

Strain produced in the pickup head 83 when the pickup head 83 is mounted to the second adjusting base 82 is released by elastic deformation of the support pieces 144a, 144b so that stress is not produced in the pickup head 83 whereby its efficiency can be maintained over a long period of time.

Further, the above described shaking preventing and shock absorbing effects are provided by elasticity of the first and second adjusting bases made of a leaf spring material and, therefore, no other elastic member such as a coil spring is necessary, so that the device can be made compact (particularly made thinner) and light and the moving speed and response characteristic can thereby be improved and the manufacturing cost can be reduced.

What is claimed is:

1. A pickup device for a disk drive device comprising a head base supported on a guide member slidably in the radial direction of a disk and a pickup head mounted on the head base and reading signals recorded on the disk or writing signals on the disk by the pickup head by moving the head base in the radial direction of the disk wherein said head base comprises:

a holder supported on said guide member slidably in the radial direction of the disk;

a first adjusting base made of a leaf spring material in the form of a plate and supported on said holder in such a manner that the first adjusting base crosses the moving direction of the holder in a state in which the first adjusting base opposes the disk substantially in parallel to a surface of the disk and is pivotable slightly about a first pivot axis which is parallel to the disk surface, and being biased in a first predetermined slightly pivoting direction by elasticity of the first adjusting base itself;

a first adjusting member for adjusting and determining a slightly pivoted position of the first adjusting base;

a second adjusting base formed of a leaf spring material in the form of a plate and supported on a side of the disk on said first adjusting member in such a manner that the second adjusting base crosses the first pivot axis in a state in which the second adjusting base opposes the disk substantially in parallel to the surface of the disk and is pivotable slightly about a second pivot axis which is parallel to the disk surface, and being biased in a second predetermined slightly pivoting direction by elasticity of itself; and a second adjusting member for adjusting and determining a slightly pivoted position of the second adjusting base, said pickup head being mounted on said second adjusting base.

2. A pickup device as defined in claim 1 wherein said first adjusting base is supported on said holder slightly pivotably along a plane which is substantially parallel to the surface of the disk and is biased in the first predetermined slightly pivoting direction by elasticity of the first adjusting base itself.

3. A pickup device as defined in claim 1 wherein said second adjusting base comprises a support piece which is adapted to be elastically deformed by elasticity of the second adjusting base itself and said pickup head is mounted on said support piece.

* * * * *